United States Patent
Matsunaga et al.

(10) Patent No.: US 11,289,931 B2
(45) Date of Patent: Mar. 29, 2022

(54) INFORMATION PROCESSING APPARATUS, INFORMATION PROCESSING METHOD, STORAGE MEDIUM, PORTABLE ELECTRICAL STORAGE DEVICE, AND RENTAL SYSTEM

(71) Applicant: HONDA MOTOR CO., LTD., Tokyo (JP)

(72) Inventors: Yoshihiro Matsunaga, Wako (JP); Sho Takada, Wako (JP); Mitsuhiro Ito, Wako (JP); Nobuyuki Sasaki, Wako (JP); Ryo Oshima, Wako (JP); Mio Oshima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 24 days.

(21) Appl. No.: 17/021,414

(22) Filed: Sep. 15, 2020

(65) Prior Publication Data

US 2020/0412150 A1 Dec. 31, 2020

Related U.S. Application Data

(63) Continuation of application No. PCT/JP2018/047186, filed on Dec. 21, 2018.

(30) Foreign Application Priority Data

Mar. 20, 2018 (JP) .............................. JP2018-053084

(51) Int. Cl.
*H02J 7/00* (2006.01)
*G06F 13/38* (2006.01)
(Continued)

(52) U.S. Cl.
CPC .......... *H02J 7/0063* (2013.01); *G06F 13/382* (2013.01); *G06Q 30/06* (2013.01);
(Continued)

(58) Field of Classification Search
CPC .... Y02E 60/10; G06Q 30/06; G06Q 30/0645; H01M 10/48; H02J 7/0047; H02J 7/0063; H02J 7/34
See application file for complete search history.

(56) References Cited

U.S. PATENT DOCUMENTS

| | | | |
|---|---|---|---|
| 2014/0258142 A1* | 9/2014 | Yamazaki | H02J 3/32 705/307 |
| 2015/0057825 A1* | 2/2015 | Steele | H02J 4/00 700/297 |
| 2016/0087314 A1 | 3/2016 | Arashima et al. | |

FOREIGN PATENT DOCUMENTS

| | | |
|---|---|---|
| JP | 2003288539 A | 10/2003 |
| JP | 2013009531 A | 1/2013 |

(Continued)

OTHER PUBLICATIONS

International Search Report for PCT/JP2018/047186 dated Mar. 19, 2019.

*Primary Examiner* — Ryan Johnson
(74) *Attorney, Agent, or Firm* — Thomas | Horstemeyer, LLP

(57) ABSTRACT

An information processing apparatus comprises acquiring information according to the usage circumstances of the portable electrical storage device; estimating a type of an electrical device that is connected, based on a measurement result with respect to a voltage and a current when the portable electrical storage device supplied electric power that is included in the information according to the usage circumstances; and, in a case where the type of the connected electrical device cannot be estimated, determining whether or not the connected electrical device is an electrical device that exhibits desirable load characteristics with respect to a storage battery that is provided in the portable electrical storage device, in accordance with whether or not (Continued)

an electric power supply amount indicated by the measurement result is equal to or greater than a predetermined threshold value.

18 Claims, 11 Drawing Sheets

(51) Int. Cl.
*H01M 10/48* (2006.01)
*G06Q 30/06* (2012.01)

(52) U.S. Cl.
CPC ........ *G06Q 30/0645* (2013.01); *H01M 10/48* (2013.01); *H02J 7/0068* (2013.01); *G06F 2213/0042* (2013.01); *Y02E 60/10* (2013.01)

(56) References Cited

FOREIGN PATENT DOCUMENTS

| | | | | |
|---|---|---|---|---|
| JP | 2013055750 A | | 3/2013 | |
| JP | 2015154706 A | * | 8/2015 | .......... H02J 13/0006 |
| WO | 2014167889 A1 | | 10/2014 | |
| WO | 2017134995 A1 | | 8/2017 | |
| WO | 2019181123 A1 | | 9/2019 | |

* cited by examiner

INFORMATION PROCESSING APPARATUS, INFORMATION PROCESSING METHOD, STORAGE MEDIUM, PORTABLE ELECTRICAL STORAGE DEVICE, AND RENTAL SYSTEM

CROSS-REFERENCE TO RELATED APPLICATION(S)

This application is a continuation of International Patent Application No. PCT/JP2018/047186 filed on Dec. 21, 2018, which claims priority to and the benefit of Japanese Patent Application No. 2018-053084 filed on Mar. 20, 2018, the entire disclosures of which are incorporated herein by reference.

TECHNICAL FIELD

The present invention relates to an information processing apparatus, an information processing method, a storage medium, a portable electrical storage device and a rental system.

BACKGROUND ART

A portable electrical storage device is known as a portable power supply apparatus. In addition to use in the home, because a portable electrical storage device can be easily carried, it is also possible to use a portable electrical storage device away from the home, such as at a campsite, and a portable electrical storage device can supply electric power to various kinds of electrical devices. On the other hand, portable electrical storage devices are relatively expensive for individuals to purchase, and although portable electrical storage devices are being made more compact, they still remain a reasonably large size. Hence, there is a tendency for users to refrain from purchasing a portable electrical storage device in a case where the principal purpose is use away from the home or the like, and the portable electrical storage device will not be used on a routine basis. Therefore, rental services that allow users to rent portable electrical storage devices are provided to meet the power supply needs of such users.

In PTL1, a system is proposed in which battery pack data that shows the usage circumstances of a rental battery pack constituted by a secondary battery is transmitted to a rental company through a network, and a fee for using the battery pack is calculated and charged based on the number of charge and discharge cycles which is obtained from the battery pack data.

CITATION LIST

Patent Literature

PTL1: Japanese Patent Laid-Open No. 2003-288539

SUMMARY OF INVENTION

Technical Problem

However, the following problems exist with regard to the aforementioned prior art. For example, rechargeable batteries provided in portable electrical storage devices are of various kinds that are differentiated based on the constituent materials thereof, such as lithium ions, nickel-metal hydride, and nickel-cadmium. In the case of these rechargeable batteries, there is a suitable method of use for each type of rechargeable battery, and if the respective rechargeable batteries are used in a way that is not appropriate, deterioration of the battery will be hastened and the lifespan of the battery will be unnecessarily shortened. Further, if a portable electrical storage device is used in a manner in which the rated output thereof is exceeded, or if a portable electric power supply apparatus is used in a manner in which the amount of discharge within a predetermined time unit exceeds a predetermined value, such use will hasten the deterioration of various components of the rechargeable battery thereof. In addition, the electric power characteristics at start-up and during use differ depending on the type of electrical device to which the electric power is supplied, and the degree of deterioration of rechargeable batteries will differ depending on differences with respect to discharging as well as the timing of charging and the like of the rechargeable batteries.

On the other hand, rental companies wish to restrict use that hastens the deterioration of a rechargeable battery at a rental destination, in order to suppress the deterioration of the rechargeable battery as much as possible. Therefore, it is desirable to appropriately identify incompatible electrical devices and inappropriate usage methods with respect to portable electrical storage device, and suppress the use of such electrical devices and usage methods. However, with respect to electrical devices, new products are constantly being developed, and in some cases unknown products such as the aforementioned kinds of new products are connected to portable electrical storage devices, and it is necessary to identify the load characteristics of such unknown products also. Further, it is desirable for rental companies to be aware of the degree of deterioration of their rental products, and to replace the rechargeable battery of a rental product at a suitable replacement timing.

An object of the present invention is to suitably acquire the usage circumstances of a portable electrical storage device at a rental destination and suitably identify a connected electrical device and a usage method, and to reduce deterioration of a storage battery. Another object of the present invention is to suitably acquire the degree of deterioration of a rechargeable battery.

Solution to Problem

According to the present invention there is provided an information processing apparatus managing usage circumstances at a rental destination of a portable electrical storage device supplying electric power to a detachably connected electrical device, the apparatus comprising:
- an acquisition unit configured to acquire information according to the usage circumstances of the portable electrical storage device; and
- an estimation unit configured to estimate a type of an electrical device that is connected, based on a measurement result with respect to a voltage and a current when the portable electrical storage device supplied electric power that is included in the information according to the usage circumstances.

Further, according to the present invention there is provided an information processing method for an information processing apparatus managing usage circumstances at a rental destination of a portable electrical storage device supplying electric power to a detachably connected electrical device, the method comprising:
- acquiring information according to the usage circumstances of the portable electrical storage device; and estimating a type of an electrical device that is connected, based on a measurement result with respect to a voltage and a current when the portable electrical storage device supplied electric power that is included in the information according to the usage circumstances.

Further, according to the present invention there is provided a non-transitory computer-readable storage medium storing a program that operates in an information processing apparatus managing usage circumstances at a rental destination of a portable electrical storage device supplying electric power to a detachably connected electrical device, the program comprising:
 an acquisition step of acquiring information according to the usage circumstances of the portable electrical storage device; and
 an estimation step of estimating a type of an electrical device that is connected, based on a measurement result with respect to a voltage and a current when the portable electrical storage device supplied electric power that is included in the information according to the usage circumstances.

In addition, according to the present invention there is provided a portable electrical storage device supplying electric power to a detachably connected electrical device, the device comprising:
 at least one of an engine generator and a storage battery configured to supply electric power to a connected electrical device;
 a measurement unit configured to measure a voltage and a current when electric power is supplied to an electrical device that is currently connected by at least one of the engine generator and the storage battery;
 a transmission unit configured to transmit a measurement result that is measured by the measurement unit to a communicably connected external apparatus; and
 a control unit configured to, upon receiving a response to the transmission by the transmission unit from the external apparatus, in a case where warning information is included in response information that is received, display information indicating that a surcharge will be imposed because the electrical device that is currently connected is an electrical device that exhibits undesirable load characteristics with respect to the portable electrical storage device, as information for a user on a display unit.

Further, according to the present invention there is provided a rental system including a portable electrical storage device supplying electric power to a detachably connected electrical device, and an information processing apparatus managing usage circumstances of the portable electrical storage device at a rental destination.
 the portable electrical storage device comprising:
 at least one of an engine generator and a storage battery configured to supply electric power to the connected electrical device,
 a measurement unit configured to measure a voltage and a current when electric power is supplied by at least one of the electric generator and the storage battery,
 a transmission unit configured to transmit a measurement result that is measured by the measurement unit to a communicably connected external apparatus, and
 a control unit configured to, upon receiving a response to the transmission by the transmission unit from the external apparatus, in a case where warning information is included in response information that is received, display information indicating that a surcharge will be imposed because the connected electrical device is an electrical device that exhibits undesirable load characteristics with respect to the portable electrical storage device, as information for a user on a display unit.

Advantageous Effects of Invention

According to the present invention, the usage circumstances of a portable electrical storage device at a rental destination can be suitably acquired, a connected electrical device and a usage method can be suitably identified, and deterioration of a storage battery can be reduced. Further, according to the present invention, the degree of deterioration of a rechargeable battery can be suitably acquired.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

The accompanying drawings, which are incorporated in and constitute a part of the specification, illustrate embodiments of the invention and, together with the description, serve to explain principles of the invention.

DESCRIPTION OF EMBODIMENTS

First Embodiment

<Configuration of System>

Figure 1:
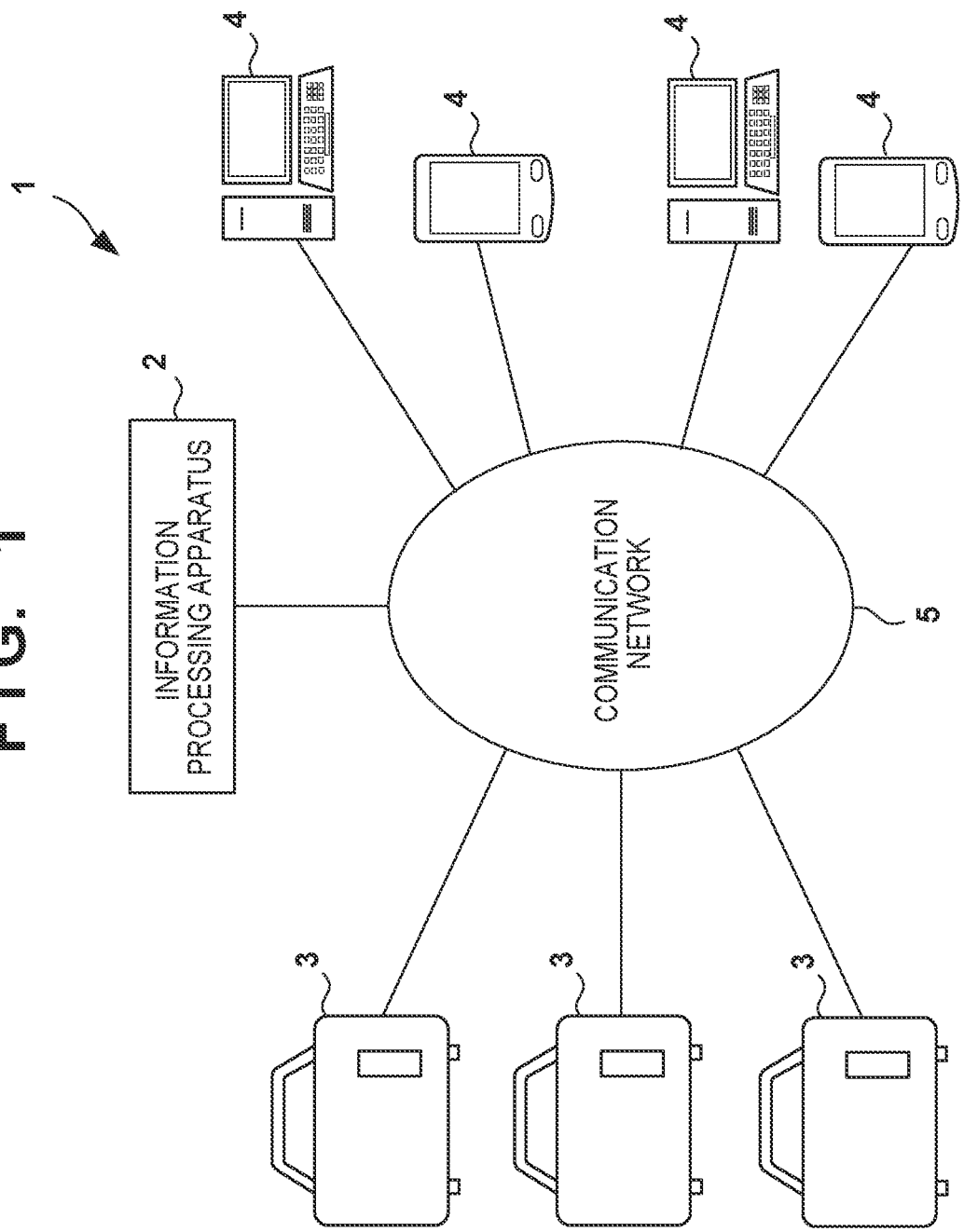
FIG. 1 is a schematic diagram of a rental system according to one embodiment of the present invention.

Hereinafter, a first embodiment of the present invention will be described. In the present embodiment, a rental system 1 in a case where a portable electrical storage device is equipped with a communication function will be described. FIG. 1 is a schematic diagram of the rental system 1. The rental system 1 includes an information processing apparatus 2 that is a management server, a plurality of portable electrical storage devices 3, and a plurality of terminals 4 which are communicably connected through a communication network 5. Although three of the portable electrical storage devices 3 are illustrated in the example in FIG. 1, the example illustrated in FIG. 1 is not intended to limit the present invention, and a large number of the portable electrical storage devices 3 can constitute part of the system 1. Likewise, although four of the terminals 4 are illustrated in the example in FIG. 1, a large number of the terminals 4 can constitute part of the system 1. Note that, the information processing apparatus 2 and the terminals 4 can be external apparatuses with respect to the plurality of portable electrical storage devices 3.

The information processing apparatus 2 is a computer that functions as a management server in the rental system 1, and manages information according to respective portable electrical storage devices that are provided by service providers, described later, and in particular, estimates connected loads based on information acquired from the portable electrical storage devices 3 and controls rental fees and the like. A portable electrical storage device (hereinafter, referred to simply as "electrical storage device") 3 is an apparatus that supplies electric power to an electrical device, and is a portable type apparatus and not a stationary type apparatus. Accordingly, the electrical storage device 3 can be carried to a usage site in accordance with the intended use of the user, such as for leisure use, business use, or use in an emergency situation.

The terminal 4 is a computer that is used by a service provider that operates a rental service for renting the electrical storage device 3 or the like, and for example is a personal computer or a hand-held device. The terminal 4 is equipped with a display device and a communication device. The term "service provider" refers to a merchant who provides a product or renders a service to a user of the electrical storage device 3. It is assumed that different merchants utilize the respective terminals 4.

In the rental system 1, the information processing apparatus 2 gathers information according to the usage circumstances of the electrical storage device 3 from the electrical storage device 3 through the communication network 5 such as the Internet, and provides the gathered information to the terminal 4. By means of the information that is provided, the service provider acquires information according to the usage circumstances of the electrical storage device 3 of each user and calculated rental fees. The operator of the information processing apparatus 2 may also provide the information in exchange for a consideration from the service provider. Based on information according to the usage circumstances of the electrical storage device 3, the user of the electrical storage device 3 is notified of various kinds of information relating to an electrical device that is connected, such as usage guidance information, or information warning of an additional rental fee or the like, and the rental fee may be discounted if the electrical storage device 3 is used in an appropriate manner.

<Portable Electrical Storage Device>

Figure 2:
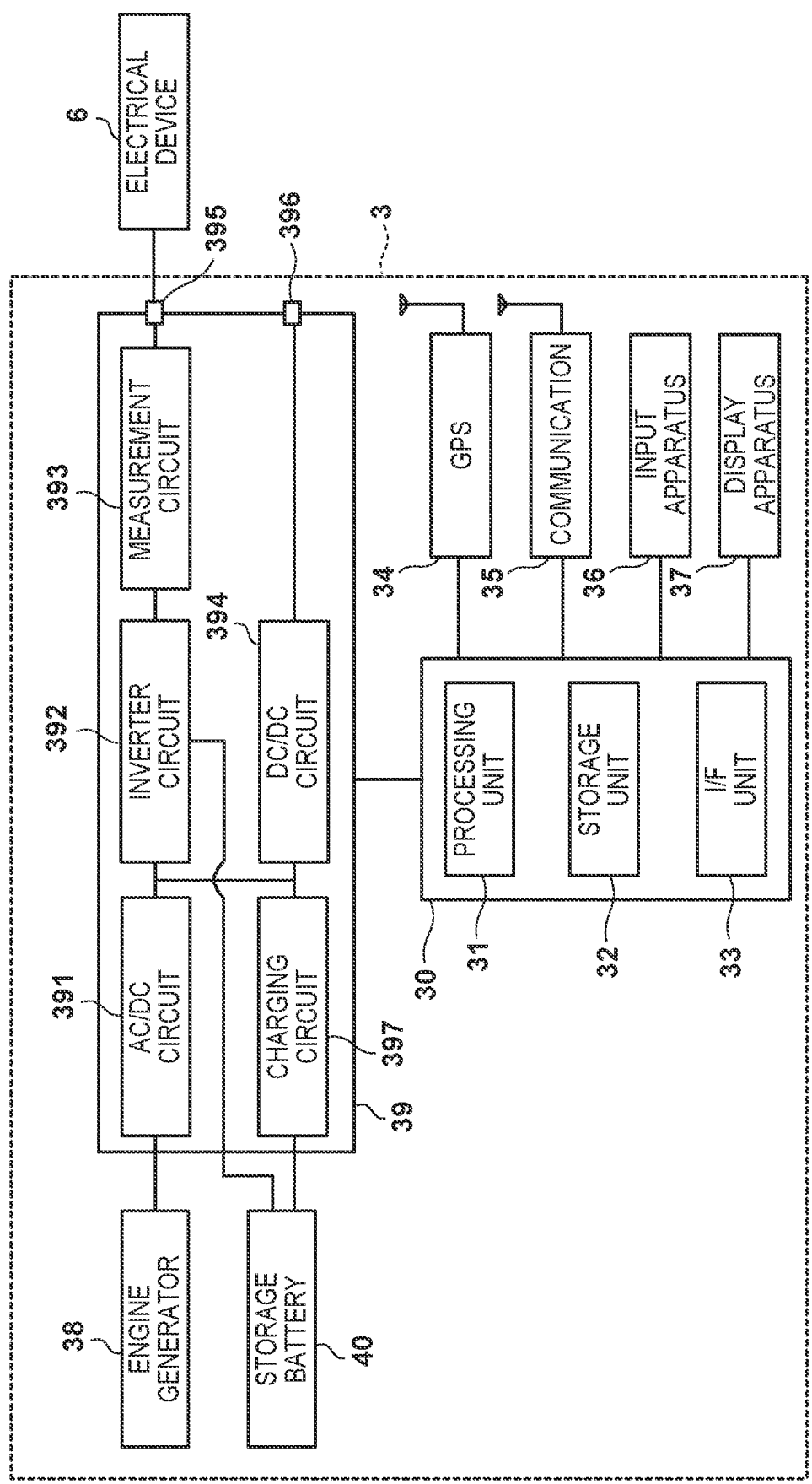
FIG. 2 is a block diagram of a portable electrical storage device according to one embodiment of the present invention.

FIG. 2 is a block diagram of the electrical storage device 3. The electrical storage device 3 of the present embodiment is an electrical storage device with an electric generator that is equipped with both an engine generator 38 and a storage battery 40. The engine generator 38 of the present embodiment is driven by fuel to generate alternating-current electric power. The fuel is, for example, gasoline, liquefied petroleum gas or hydrogen. The storage battery 40 is a battery in which, for example, lithium ions, nickel-metal hydride, or nickel-cadmium is employed as a constituent material, and which outputs a DC voltage of 48 V or the like to an inverter circuit 392 or a DC/DC circuit 394.

A power supply circuit 39 is a circuit that converts a voltage generated by the engine generator 38 into a predetermined alternating current or direct current. The AC/DC circuit 391 has a rectifying and smoothing circuit that rectifies and smooths an alternating current generated by the engine generator 38, or the like. The inverter circuit 392 converts a direct current generated by the AC/DC circuit 391 or a direct current supplied from the storage battery 40 into stable alternating current of a predetermined frequency. The charging circuit 397 charges the storage battery 40 based on electric power generated by the engine generator 38. The electrical storage device 3 illustrated in FIG. 2 is capable of supplying electric power that is stored in the storage battery 40 to an electrical device 6 even after the fuel of the engine generator 38 runs out.

A measurement circuit 393 includes a current sensor and a voltage sensor, and measures an AC voltage and an AC current supplied from the inverter circuit 392 to an electrical device 6 connected to an AC outlet 395, and outputs the measurement result to a control circuit 30. The electrical device 6 that is capable of driving by means of alternating-current electric power is detachably connected to the AC outlet 395. In a case where the electrical storage device 3 is used for leisure purposes, examples of the electrical device 6 that may be mentioned include a cooking device, an air conditioner, a television, a lighting device, and a dryer. Examples of the cooking device that may be mentioned include a hot plate, a kettle, a microwave oven, a grill, and a blender. In a case where the electrical storage device 3 is used for business purposes, examples of the electrical device 6 that may be mentioned include an electric power tool, a large-size lighting apparatus, and a compressor.

The DC/DC circuit 394 converts the level of a DC voltage that is output from the AC/DC circuit 391, and supplies an operating voltage to the control circuit 30 and the like, and outputs an operating voltage to a DC outlet 396. The electrical device 6 that can be driven by DC power is detachably connected to the DC outlet 396.

The control circuit 30 is a circuit that performs control of the electrical storage device 3. The control circuit 30 includes a processing unit 31, the storage unit 32 and an I/F (interface) unit 33. The processing unit 31 is a processor that is typified by a CPU, and executes a program stored in the storage unit 32. The storage unit 32 is a storage device such as a RAM, a ROM, or a hard disk. In addition to a program that the processing unit 31 executes, various kinds of data are also stored in the storage unit 32. The I/F unit 33 relays signals that are exchanged between an external device and the processing unit 31.

A GPS sensor 34 detects the current position of the electrical storage device 3. A communication apparatus 35 is a radio communication apparatus which carries out communication of information between the information processing apparatus 2 and the terminal 4 through the communication network 5. An input apparatus 36 is an apparatus that accepts input of operations by a user of the electrical storage device 3, and for example is a plurality of switches. The display apparatus 37 is an apparatus that displays information to a user of the electrical storage device 3, and for example is an image display apparatus such as a liquid crystal display or is alight emitting device such as an LED. A touch panel-type liquid crystal display may be adopted. In such a case, the display apparatus 37 will include a part of the input apparatus 36.

The processing unit 31 transmits information regarding the current position that is detected by the GPS sensor 34 and a measurement result of the measurement circuit 393 to the information processing apparatus 2 by means of the communication apparatus 35, and executes processing of a program stored in the storage unit 32. A measurement result of the measurement circuit 393 can be utilized as information according to the type of electrical device 6 connected to the AC outlet 395 of the electrical storage device 3, and in particular can be utilized to estimate the type of electrical device 6. Electric power that is supplied to the electrical device 6 exhibits a waveform whose characteristics are determined by the type of electrical device 6. The type of the electrical device 6 that is connected can be estimate based on feature values of the waveform. Further, by means of the waveform, the electric power supply amount can be ascertained, and the usage method can be identified.

The feature values are, for example, an apparent power and a power factor. The power factor is obtained by dividing the effective power by the apparent power, or is determined as the cosine ($\cos \theta$) of the phase difference between the voltage and the current. In the latter case, the measurement circuit 393 measures a phase difference $\theta$. In addition, the feature values may include a time period from when the electrical device 6 starts up until the electrical device 6 operates stably, or a peak value of a starting current flowing to the electrical device 6 when the electrical device 6 starts up. The relation between the kinds of electrical device 6 and the feature values can be represented in advance in data format as a feature value map, and the type of electrical device 6 can be estimated by comparing the feature values measured by the measurement circuit 393 with the feature value map.

Figure 4:
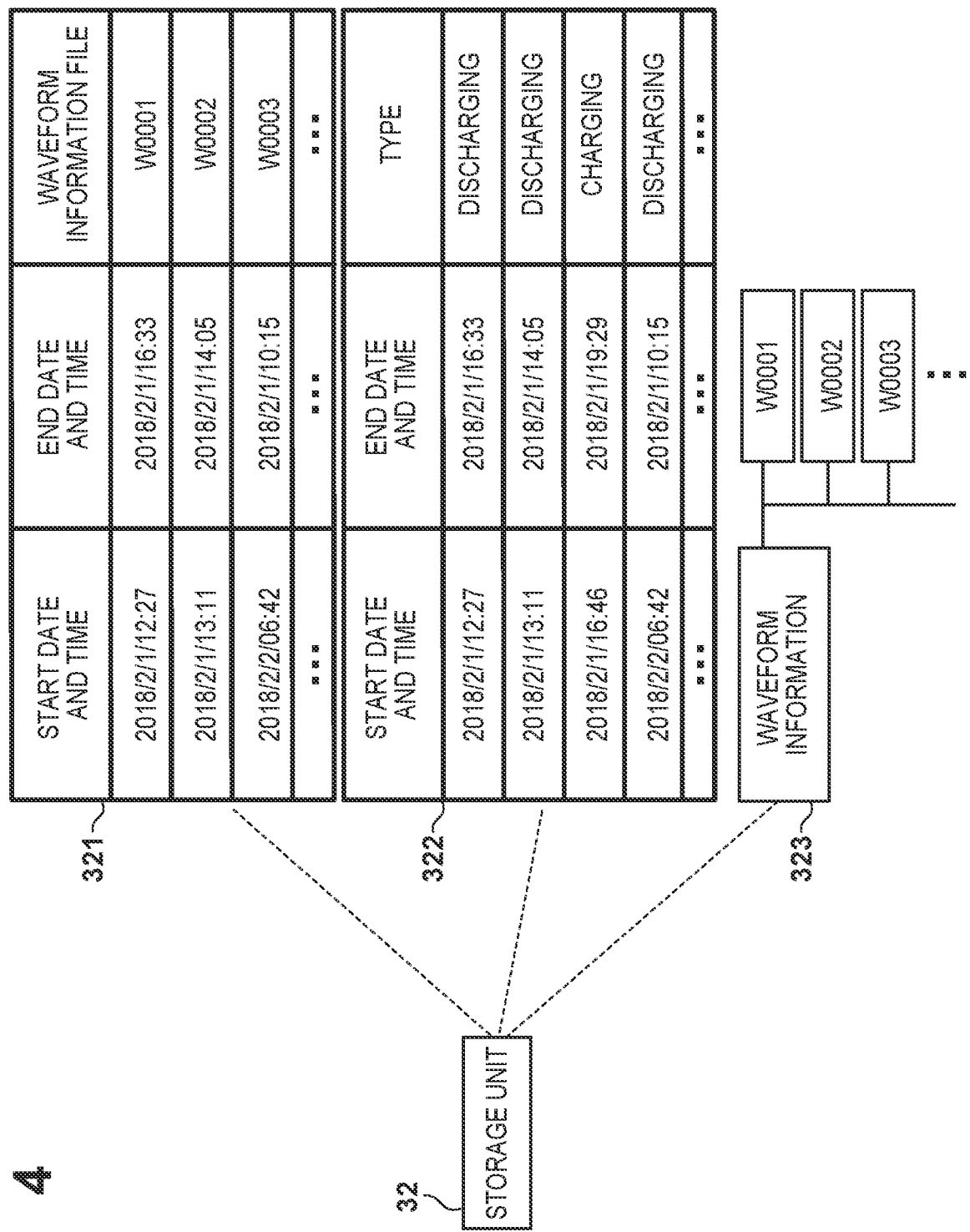
FIG. 4 is a view illustrating information that is held in a storage unit 32 of the portable electrical storage device.

FIG. 4 illustrates various kinds of information 321 to 323 stored in the storage unit 32 during use, in the electrical storage device 3. Various kinds of information according to the stored waveforms mentioned above is stored as the information 321. The item "Start Date and Time" shows the date and time that storing of the waveform started, and the item "End Date and Time" shows the date and time that storing of the relevant waveform ended. The item "Waveform Information File" is an identifier that shows the file of stored waveform information. The waveform information file that corresponds to the relevant identifier is included in the waveform information 323.

Information according to charging/discharging of the engine generator 38 and the storage battery 40 is stored as the information 322. The item "Start Date and Time" shows the date and time that charging/discharging started, and the item "End Date and Time" shows the date and time that the storing of the relevant charging/discharging ended. The item "Type" shows the type of the stored charging/discharging, for example, the "Type" item includes information indicating "Charging" or "Discharging". In addition to storing such information according to charging/discharging, a configuration may be adopted in which information according to the amount of discharging and the amount of charging, respectively, is stored. Further, with respect to "Discharging", it is desirable that information is stored in a manner that enables identification of which one among the engine generator 38 and the storage battery 40 was used for discharging.

The information stored in the storage unit 32 may be transferred by the communication apparatus 35 through the communication network 5 to the information processing apparatus 2 or to the terminal 4 of the service provider that provided the relevant electrical storage device 3. Alternatively, when the relevant electrical storage device 3 is returned to the service provider, the information stored in the storage unit 32 may be read to the terminal 4 through a USB (universal serial bus) connection or the like. The various kinds of information described above are used for determining the deterioration of the storage battery 40 and for calculating a rental fee and the like to be described later.

<Information Processing Apparatus>

Figure 3:
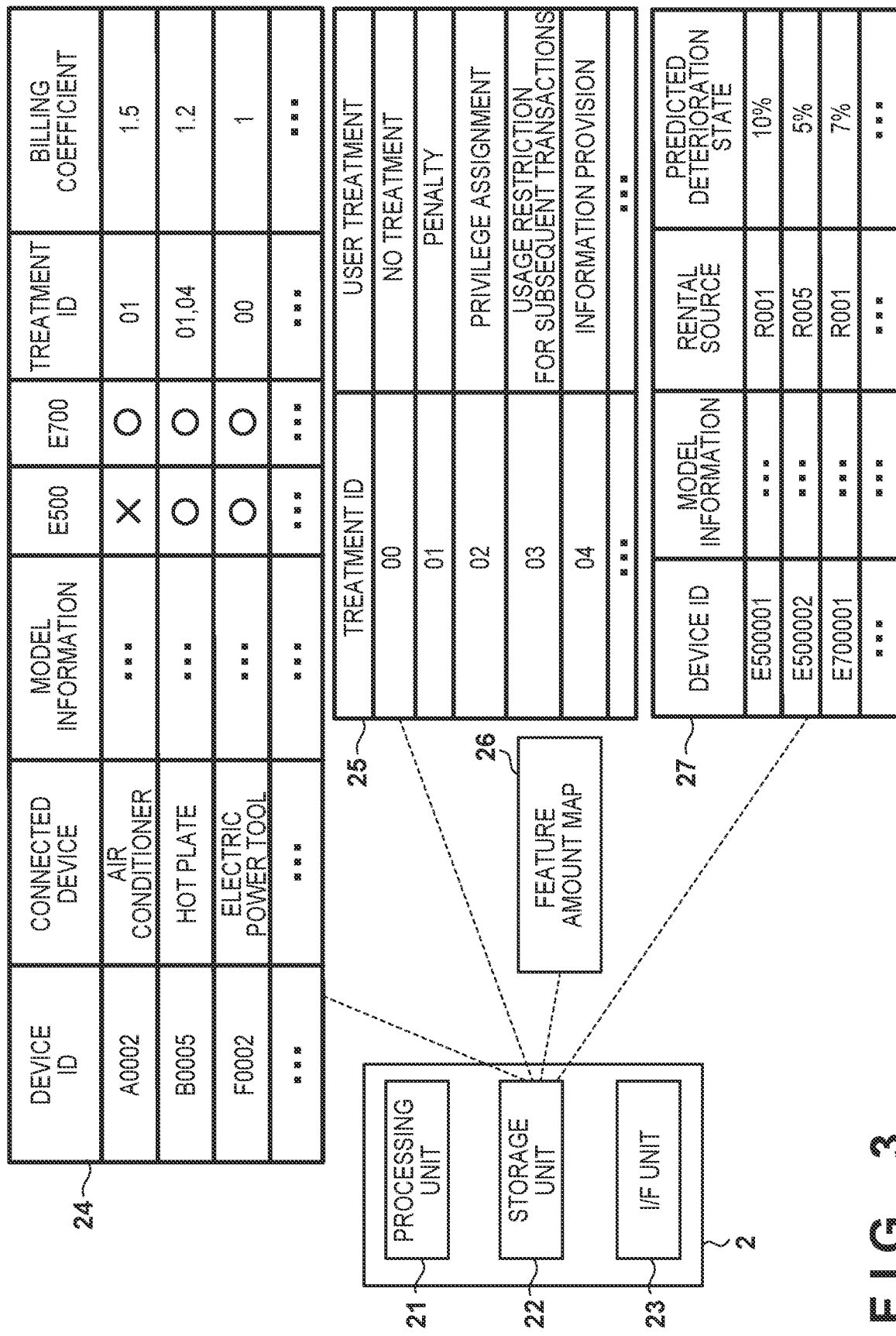
FIG. 3 is a block diagram of an information processing apparatus according to one embodiment of the present invention.

FIG. 3 is a block diagram of the information processing apparatus 2 that is a management server that manages the rental system 1. The information processing apparatus 2 includes a processing unit 21, a storage unit 22 and an I/F (interface) unit 23. The processing unit 21 is a processor that is typified by a CPU, and reads a program stored on a ROM or a HDD included in the storage unit 22 to a RAM and executes the program. The I/F unit 23 relays signals that are exchanged between an external device and the processing unit 21. The IF unit 23 includes a wired or wireless communication interface that is capable of communicating with the electrical storage device 3 and the terminal 4 through the communication network 5. The storage unit 22 is a storage device such as a RAM, a ROM or a hard disk.

Various kinds of data are stored in the storage unit 22, in addition to a program that the processing unit 31 executes. In the example illustrated in FIG. 3, databases 24 to 27 are illustrated as examples of data stored in the storage unit 22. The database 24 is a database which stores data relating to electrical devices connected to the electrical storage device 3. The item "Device ID" is an identifier that is assigned in order to identify individual electrical devices. In the case of the present embodiment, the identifier is assigned in advance to a predetermined electrical device. However, a configuration can also be adopted in which the identifier is assigned when performing communication. Further, when a new electrical device that the information processing apparatus 2 does not recognize is used with the electrical storage device 3, the aforementioned kinds of information may be acquired and a new identifier assigned, and the new electrical device may be registered in the database 24.

The item "Connected Device" is information showing the kinds of electrical device 6 currently connected to the electrical storage device 3. In the case of the present embodiment, the database 26 is a database which stores a feature value map. The processing unit 21 estimates the type of an electrical device 6 that is currently connected to the electrical storage device 3 by comparing information according to the type of electrical device 6 that is transmitted from the electrical storage device 3 (in this case, a measurement result of a measurement circuit 398) with the feature value map, and stores the estimation result as a "connected device". Note that, the information according to the type of electrical device 6 that is transmitted from the electrical storage device 3 may be the actual measurement result of the measurement circuit 398, or may be feature values calculated on the electrical storage device 3 side. Further, in the present embodiment, although a form is adopted in which the type of electrical device 6 is estimated on the information processing apparatus 2 side, a form may be adopted in which the type of the electrical device 6 is estimated on the electrical storage device 3 side, and the estimation result is transmitted to the information processing apparatus 2 as information according to the type of the electrical device 6.

The item "Model Information" is information according to the specifications of the connected device. For example, the information pertains to the drive system, the inrush current, the electric power consumption in a steady state, or the like. The columns "E500" and "E700" are information indicating whether or not the connected device is a compatible electrical device with respect to the different classifications of electrical storage devices. The term "compatible electrical device" means, for example, that the electrical device is an electrical device exhibiting desirable load characteristics that operates within the range of a rated output which differs for each electrical storage device. The characters "E500" and "E700" are character strings that indicate classifications of the electrical storage devices. Accordingly, it is needless to say that information of other electrical storage devices may also be held. Such information is represented by a "○" symbol or a "X" symbol in FIG. 3. The "○" symbol indicates that the relevant electrical device exhibits desirable load characteristics with respect to the electrical storage device, and the "X" symbol indicates that the relevant electrical device exhibits undesirable load characteristics with respect to the electrical storage device. The item "Treatment ID" is an identifier indicating the classification of the treatment to be performed with respect to the user in a case where supply of electric power to the relevant connected device is performed by means of the electrical storage device 3. The treatment ID is associated with information indicating the actual user treatment in the database 25 that is described later. The item "billing coefficient" shows a discount rate or a surcharge with respect to the rental fee for the user that rented the electrical storage device 3, in a case where supply of electric power to the relevant connected device was performed by the electrical storage device 3.

The database 25 is a database that shows the contents of the user treatment that is associated with each treatment ID. In the present embodiment, the treatment to be performed with respect to the user is controlled for each connected device that the user connects to the electrical storage device 3 and supplies power to, and the contents of the respective treatments are defined in detail. The administrator registers each treatment in advance, and provides the treatments to each terminal 4 that the service provider possesses. The item "Treatment ID" is as described above. The item "User Treatment" shows the contents of the user treatments associated with the respective treatments.

For example, to provide no special treatment is defined as the content of the response with respect to the treatment ID "00". Similarly, treatment that involves imposing a penalty on the user is defined with respect to the treatment ID "01". For example, treatment such as adding a surcharge to the rental fee or reducing points that are assigned to the user is performed. In this case, the term "points" refers to points that are assigned to the respective users, and upon a user accumulating a certain number of points, a discount coupon to be used for subsequent transactions may be issued to the user or a free gift or the like may be given to the user. Treatment that involves assigning a special privilege to the user is defined with respect to the treatment ID "02". For example, the treatment may be to discount the rental fee or increase the number of points that are assigned. Treatment that involves imposing a usage restriction for subsequent transactions is defined with respect to the treatment ID "03". For example, the treatment may be to restrict the type of electrical storage device 3 that can be rented or the rental time period, or to prohibit the user from renting an electrical storage device 3 for a fixed period. Treatment that involves providing the user with information such as information relating to the method of use for the relevant connected device is defined with respect to the treatment ID "04".

According to the present embodiment, the aforementioned user treatment is determined according to the kind or usage method of the electrical device that the user connected (hereinafter, referred to as "connected device") to the electrical storage device 3. For example, in a case where the electrical storage device 3 is utilized with a predetermined electrical device (hereinafter, referred to as "designated device") or in accordance with a predetermined usage method, some type of special privilege is assigned to the relevant user, while in a case where the electrical storage device 3 is utilized with an electrical device other than a designated device or by a usage method other than a designated usage method, some type of penalty is imposed on the relevant user or some type of information is provided to the relevant user.

A database 27 is a table that manages the degree of deterioration of storage batteries in rental products that a service provider rents out. The item "Apparatus ID" is an identifier for individually identifying rental products. The model information includes information such as the rated output of the relevant electrical storage device that is a rental product. Further, compatible electrical devices may also be included in the model information. The item "Rental Source" is information that shows the service provider. The item "Predicted Deterioration State" is an item in which information indicating the deterioration state of the storage battery is stored, and which is information that is updated as required in accordance with processing that is described later. The deterioration state of the storage battery changes depending on the usage circumstances such as the number of charge and discharge cycles, the charging/discharging method, and the usage environment, and can be identified by inputting these items of information into a formula that is prescribed in advance or the like. There are various factors that cause a storage battery to deteriorate, and such deterioration factors include, in addition to the number of charge and discharge cycles and the charging/discharging amount in normal use, for example, charging being continued even though the storage battery is fully charged, the storage battery being left uncharged for a long period with a charged amount of 0%, and use of the storage battery in a high-temperature environment. With regard to the aforementioned formula, the formula will vary depending on the classification of the relevant storage battery, and it is difficult to comprehensively cover all of the various factors in detail. Therefore, a detailed description of the formula will be omitted here, since it is a specification that is decided by an administrator of the rental system or the like. Note that, when the predicted deterioration state exceeds a predetermined value (for example, 70%), a notification may be sent to the terminal 4 of the rental source to indicate that it is time to replace the relevant rental product.

<Processing of Electrical Storage Device 3>

Figure 5:
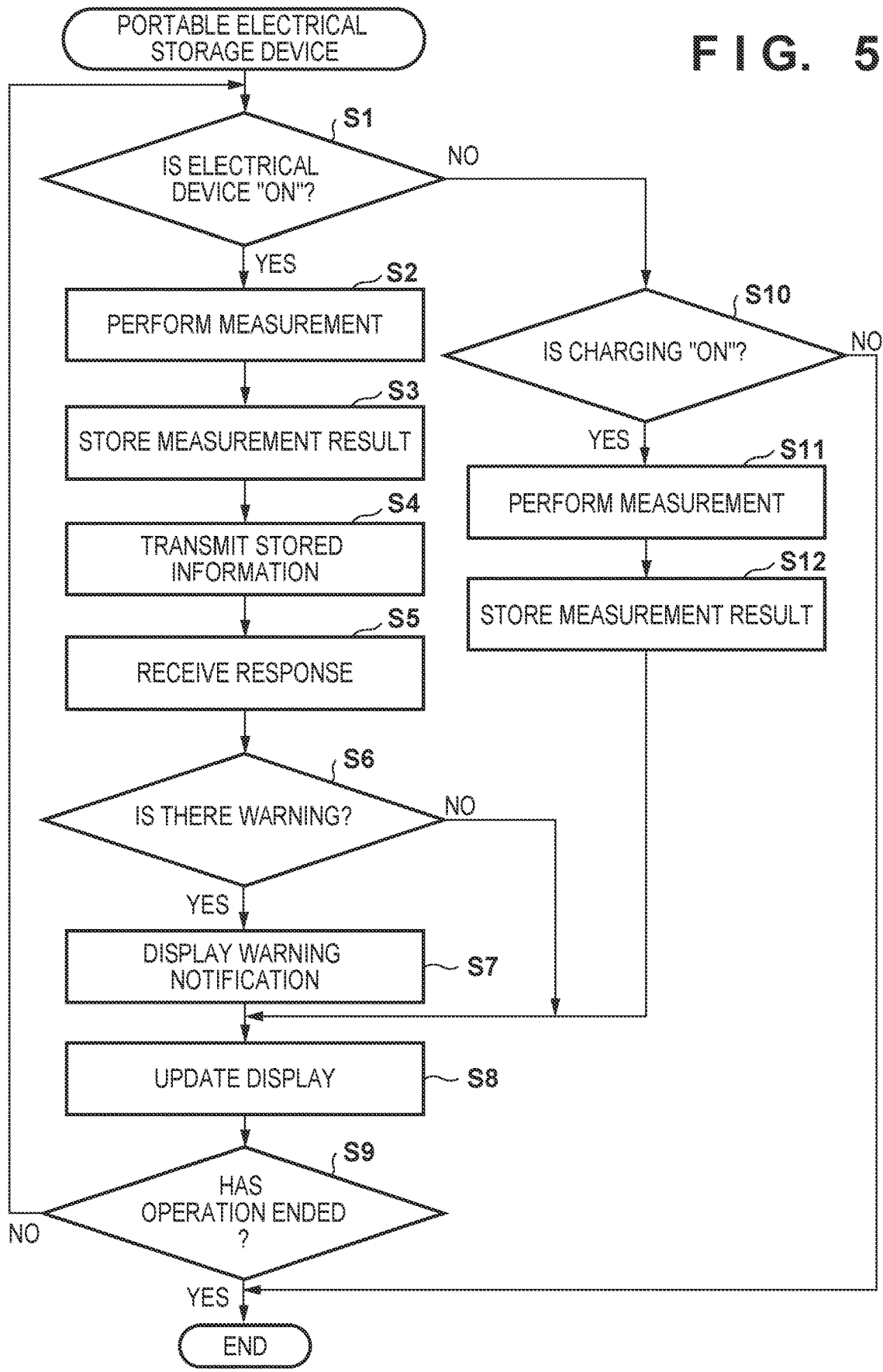
FIG. 5 is a flowchart illustrating an example of processing executed by the portable electrical storage device.

Hereunder, an example of processing in the rental system 1 will be described. First, referring to FIG. 5, an example of processing that measures and stores the usage circumstances with respect to the electrical storage device 3 will be described. The processing described hereunder is implemented by, for example, the processing unit 31 reading a control program that is stored in advance on the ROM or HDD of the storage unit 32 to the RAM and executing the control program. When an operation for discharging or charging is started at the electrical storage device 3, the processing in S1 is executed. Note that, the electrical storage device 3 is activated by the engine generator 38 starting up and generating electric power. The engine generator 38, for example, is started up upon the user performing a start-up operation.

In S1, the processing unit 31 determines whether or not electric power is being supplied to the electrical device 6 (the electrical device is "ON"). If electric power is being supplied, the processing unit 31 proceeds to S2, and if not the processing unit 31 proceeds to S10. In S2, the processing unit 31 uses the measurement circuit 393 to measure the supplied power, and in S3 the processing unit 31 stores the measurement result (date and time of discharge and waveform information) in the storage unit 32. That is, the information 321 to 323 shown in FIG. 4 is stored at this time. Further, information that identifies whether the electric power that was used was generated by the engine generator 38 or was electric power that was stored in the storage battery 40 may be included in the measurement result. Next, in S4, the processing unit 31 transmits the measurement result stored in the storage unit 32 to the information processing apparatus 2 through the communication network 5 together with other parameters. In this case, the other parameters include, for example, information regarding the current position detected by the GPS sensor 34, information relating to the electrical storage device 3, and information relating to the electrical device 6 that is connected. Note that, it is desirable that the transmission in S4 is performed at fixed intervals. Since the communication load will increase if measurement results are always transmitted in real time, it is assumed that the transmission is performed intermittently. Note that, with respect to the interval, in order to display a warning screen or the like that is described later, the interval may be set to a short period when the electrical storage device 3 is activated or when a new load is connected, and may be set to a longer period when the electrical storage device 3 transitions to a steady state. Further, a configuration may also be adopted so that transmission of stored information is performed after the supply of electric power to the relevant connected device is stopped after the electrical storage device 3 transitioned to a steady state.

Next, in S5, the processing unit 31 receives response information from the information processing apparatus 2. Although the details of the response information will be described later, the response information includes at least warning information or fee information that is based on the electrical device 6 which is estimated by the information processing apparatus 2. Next, in S6, the processing unit 31 determines whether or not warning information is included in the received response information. If warning information is not included, the processing unit 31 proceeds to S8, while if warning information is included, the processing unit 31 proceeds to S7. In this case, the "warning information" is information for notifying the user that a connected device exhibiting undesirable load characteristics such that the load is higher than the load of a connected device exhibiting desirable load characteristics with which the relevant electrical storage device 3 can stably operate is connected to the electrical storage device 3. In addition, the warning information includes information for notifying the user in advance that an extra rental fee will be charged because a connected device that exhibits undesirable load characteristics is connected to the electrical storage device 3.

Figure 8:
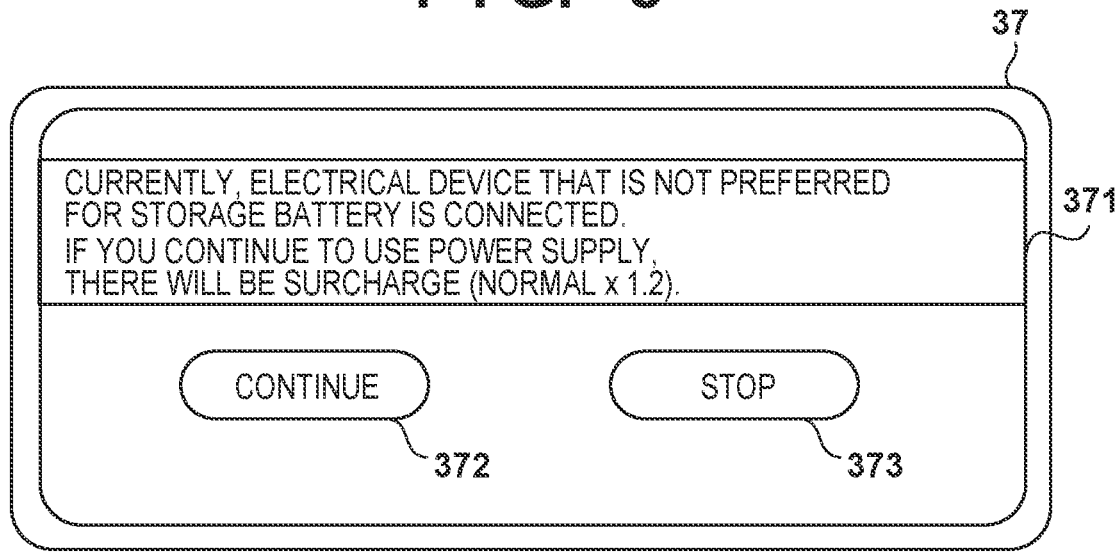
FIG. 8 is a view illustrating an example of a display on a display apparatus 37 of the portable electrical storage device.

In S7, in order to warn the user that a connected device that exhibits undesirable load characteristics with respect to the electrical storage device 3 is connected, the processing unit 31 displays a warning screen on the display apparatus 37 in accordance with the warning information included in the response information described above. That is, screen information for a warning screen is also included in the response information. An example of the warning screen is illustrated in FIG. 8. As illustrated in FIG. 8, on a warning screen 371, a message indicating that a surcharge will be imposed if usage of the electrical storage device 3 is continued because an electrical device that exhibits undesirable load characteristics is connected is displayed, and together with the message, buttons 372 and 373 are displayed that allow the user to select whether or not to continue to supply electric power to the connected device in question. The button 372 is a button for instructing the electrical storage device 3 to continue to supply electric power, and the button 373 is a button for instructing the electrical storage device 3 to stop supplying electric power. If the user inputs an instruction to continue supplying electric power, for example, a rental fee that is a surcharge of 1.2 times relative to the standard fee is added with respect to the amount of discharge during use. Note that, although in this case processing is described that corresponds to an electrical device with a load of a level which the electrical storage device 3 is capable of supporting even though the electrical device exhibits undesirable load characteristics, for example, in a case where a device is connected which would significantly accelerate the deterioration of various components of the engine generator 38, control may be performed to display a warning screen and, together therewith, to stop the supply of electric power. In such a case, it is desirable to display a message indicating that the supply of electric power was stopped as well as the reason for stopping the supply of electric power on the display apparatus 37. When the processing in S7 ends, the processing unit 31 proceeds to S8.

On the other hand, if it is determined in S1 that power is not being supplied, in S10 the processing unit 31 determines whether or not charging of the storage battery 40 is being performed by the engine generator 38. If charging is being performed, the processing unit 31 proceeds to S11, and if not the processing unit 31 ends the present processing flow. In S11, the processing unit 31 performs measurement of the charging by means of the charging circuit 397. In S12, the processing unit 31 stores the charging result (charging date and time and charged amount) in the storage unit 32, and then proceeds to S8. That is, the information 322 illustrated in FIG. 4 is stored at this time. The measurement in question may be performed by the charging circuit 397 itself, or may be performed by the measurement circuit 393. Alternatively, a dedicated measurement circuit may be separately provided. Further, although an example in which the charging result is stored only in the storage unit 32 has been described here, the relevant charging result may also be transmitted through the communication network 5 to the information processing apparatus 2, in the same manner as the measurement result is transmitted in S4. By this means, the information processing apparatus 2 can acquire the measurement result and the charging result as usage circumstances of the electrical storage device 3, that is, can acquire information according to charging/discharging. Hence, the information processing apparatus 2 can identify the degree of deterioration of the rechargeable battery in more detail based on the relevant charging/discharging information, and can control the user treatment. For example, in a case where charging is repeated more than necessary, the information processing apparatus 2 may be configured to determine that the electrical storage device 3 is being used according to a usage method that violates the terms of use with respect to the electrical storage device 3, and to impose a penalty on the user.

Figure 9:
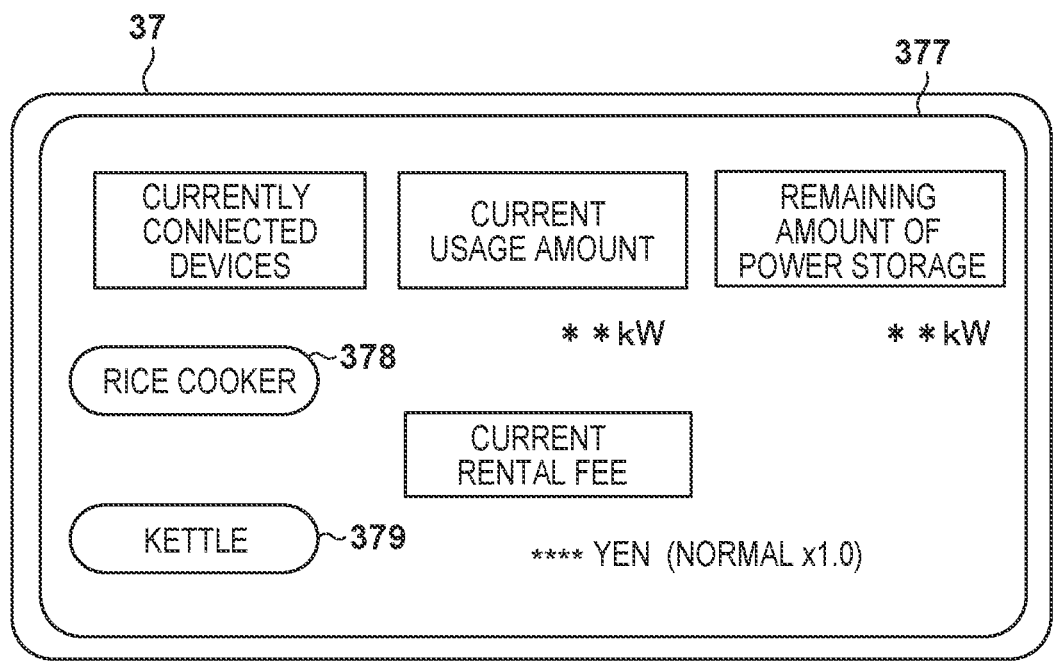
FIG. 9 is a view illustrating an example of a display on a display apparatus 37 of the portable electrical storage device.

In S8, the processing unit 31 updates the display of the screen that is displayed on the display apparatus 37 during use of the electrical storage device 3, based on the response information or measurement result received in S5, and then proceeds to S9. The screen illustrated in FIG. 9 is an example of a screen that is displayed on the display apparatus 37 when the electrical storage device 3 is operating. The screen information of a screen 377 that is the screen in question may be included in response information that is generated by the information processing apparatus 2 and transmitted to the electrical storage device 3 in S26, or may be generated by the electrical storage device 3 using the response information.

The screen 377 can be constituted by including buttons 378 and 379 showing the currently connected devices, the current amount of used electric power, the current rental fee, and the residual capacity. Note that, the present invention is not limited to this screen configuration, and the screen may be constituted by adding other various kinds of information. When the button 378 or button 379 is selected, information according to the relevant connected device is displayed (not illustrated in the drawings). For example, the aforementioned guidance information that shows the method for using the relevant connected device may be displayed. Note that, each of the current connected devices may be displayed in a manner such that it is possible to distinguish whether or not the relevant connected device exhibits desirable load characteristics. For example, the connected devices may be displayed in a manner such that whether or not each connected device exhibits desirable load characteristics is distinguishable by the display color of the button, or a distinguishable character string, symbol or mark or the like may be displayed adjacent to the button. The screen 377 is preferably updated each time response information is received from the information processing apparatus 2.

In S9, the processing unit 31 determines whether or not the operation to supply electric power or the charging operation has ended. If the operation has not ended, the processing unit 31 returns the processing to S1, while if the operation has ended, the processing unit 31 ends the present processing flow.

<Processing of Information Processing Apparatus 2>

Next, an example of processing of the information processing apparatus 2 will be described referring to FIG. 6. The processing described hereunder is implemented by, for example, the processing unit 21 reading a control program that is stored in advance on the ROM or HDD of the storage unit 22 to the RAM and executing the control program. Note that, in the present flowchart it is assumed that the charging result stored in S12 is also transmitted in addition to the measurement result that is transmitted from the electrical storage device 3 in S4. In a case where the charging result is not transmitted, the processing in S23 described hereunder is skipped.

In S21, the processing unit 21 receives the measurement result and charging result (information relating to the usage circumstances) that are transmitted by the electrical storage device 3 in S4. As mentioned above, the measurement result includes at least the discharging date and time, waveform information, and the discharge source (the engine generator 38 or the storage battery 40). The charging result includes at least the charging date and time and the charged amount. Next, in S22, the processing unit 21 calculates feature values based on the received measurement result, and compares the calculation result with a feature value map of the database 26 to estimate the type of electrical device 6 that is connected to the electrical storage device 3. In a case where a feature value map that matches the result for comparison does not exist, the processing unit 21 determines that the connected device is a device other than a designated device, and updates the database 24 on the assumption that a new type of electrical device is connected.

Next, in S23, the processing unit 21 analyzes the charging/discharging at the electrical storage device 3, based on the charging result and measurement result transmitted from the electrical storage device 3. In this case, for example, the processing unit 21 counts the number of times that charging and discharging were performed based on the aforementioned two items of information, and generates charging/discharging information that includes the count information. Note that, the processing unit 21 may analyze other parameters associated with charging/discharging, and generate the obtained results as charging/discharging information. Next, in S24, the processing unit 21 determines the degree of deterioration of the storage battery 40. Specifically, the processing unit 21 determines the degree of deterioration of the storage battery 40 using a predetermined formula based on a supplied electric power amount that is determined from the waveform information received in S21, charging/discharging information analyzed in S23, and the usage circumstances. The information regarding the determined degree of deterioration is accumulated in the database 27 in S30 that is described later. By this means, the degree of deterioration of the rental product or a replacement timing for the rental product can be notified to the service provider. Next, in S25, the processing unit 21 determines whether or not the type of the electrical device 6 was estimated in S22. If the type of the electrical device 6 was estimated, the processing unit 21 proceeds to S27, while if the kind was not estimated, the processing unit 21 proceeds to S26. In S26, the processing unit 21 executes compatibility determination processing for determining whether or not the electrical device 6 is an electrical device that exhibits desirable load characteristics with respect to the storage battery 40 based on the waveform information received in S21, and thereafter proceeds to S27. The compatibility determination processing is described in detail later using FIG. 7.

Next, in S27, the processing unit 21 executes user treatment processing. The user treatment processing is processing for determining the treatment with respect to the user based on the electrical device estimated in S22 and the degree of deterioration of the storage battery 40. Specifically, the processing unit 21 determines the user treatment based on information regarding the electrical device that is estimated in S22, the result of the deterioration determination in S24, and information of the databases 24 and 25 (treatment ID, user treatment).

Next, in S28, the processing unit 21 calculates the current rental fee based on the waveform information received in S21 and the user treatment determined in S27. Although the rental fee fundamentally increases in proportion to the electric power supply amount, a surcharge or discount is set according to the user treatment that is determined in accordance with whether or not a designated connected device or usage method is used, and is calculated using these items of information. The details regarding calculation of the rental fee are described later using FIG. 7.

Next, in S29, the processing unit 21 transmits response information to respond to the information received in S21 to the electrical storage device 3. At least the type of electrical device estimated in S22, the result of the compatibility determination obtained in S26, information regarding the user treatment determined in S27, and the rental fee calculated in S28 are included in the response information, and as necessary the aforementioned warning information or the like is included in the information regarding the user treatment. Next, in S30, the processing unit 21 updates the database 24 based on these items of information, and then ends the present processing flow. In this case, if an unknown electrical device is connected to the electrical storage device 3, in accordance with the result of the compatibility determination processing determined in S26, information indicating whether or not the relevant electrical device is a connected device that exhibits desirable load characteristics with respect to the electrical storage device 3 is added to the database 24. Further, the processing unit 21 updates the predicted deterioration state of the relevant electrical storage device 3 in the database 27 in accordance with the degree of deterioration determined in S24.

<Compatibility Determination Processing>

Figure 7:
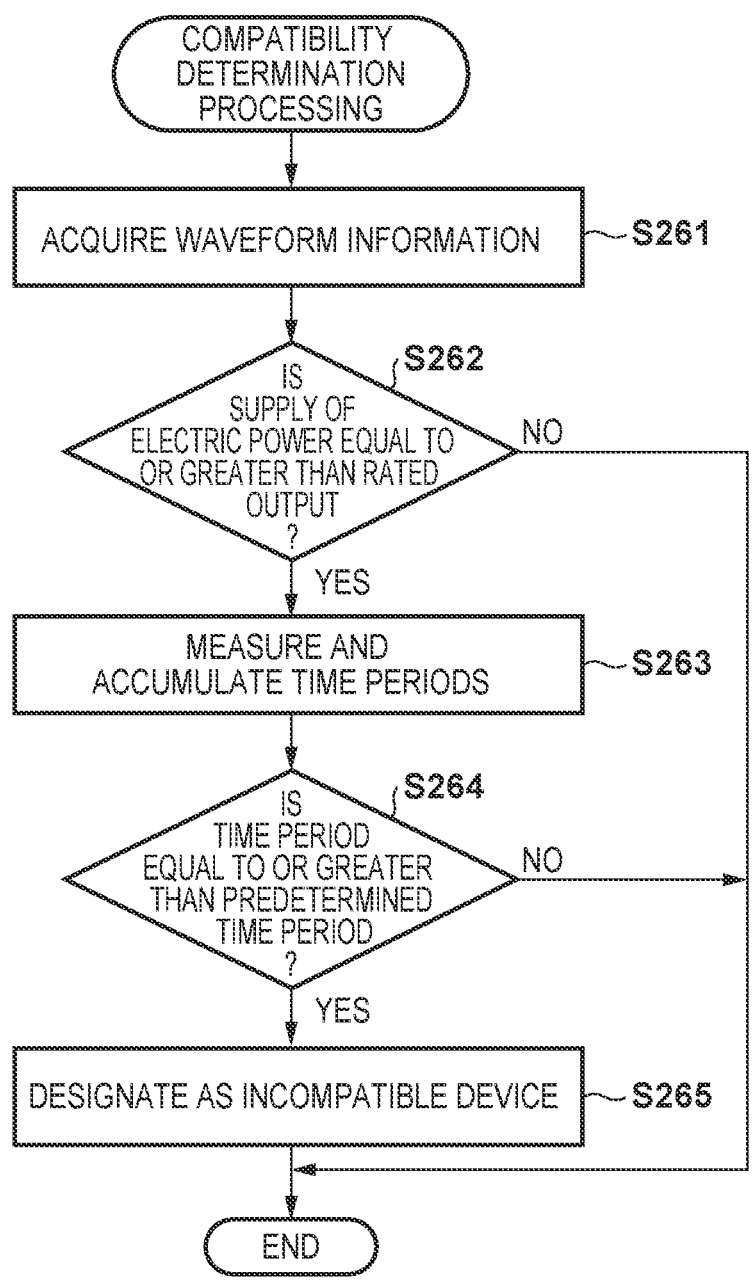
FIG. 7 is a flowchart illustrating a processing example of compatibility determination processing in the information processing apparatus.

Next, the details of the compatibility determination processing that is executed in the aforementioned S24 at the information processing apparatus 2 will be described referring to FIG. 7. The processing described hereunder is implemented by, for example, the processing unit 21 reading a control program that is stored in advance on the ROM or HDD of the storage unit 22 to the RAM and executing the control program.

In S261, the processing unit 21 acquires waveform information of the electrical storage device 3 received in S21. Next, in S262, the processing unit 21 analyzes the waveform information and, with respect to the supply of electric power from the electrical storage device 3 to the connected device, determines whether or not supply of electric power equal to or greater than the rated output for the relevant electrical storage device 3 was performed. For example, depending on the device, in some cases the inrush current is high and the rated output is exceeded at such time, and in such a case it is determined here that an operation which has an adverse effect on deterioration of the electrical storage device 3 (storage battery) is performed by such an unknown device. Note that, although in this case it is determined whether or not the supplied electric power is equal to or greater than the rated output, this example is not intended to limit the present invention, and a configuration may be adopted in which it is determined whether or not the supplied electric power is equal to or greater than a predetermined threshold value. If it is determined in S262 that there is a waveform which is equal to or greater than the rated output, the processing unit 21 proceeds to S263, while if it is determined in S262 that there is not such a waveform, the processing unit 21 ends the present processing flow.

In S263, the processing unit 21 measures the time periods of intervals for which it was determined that the supplied electric power was equal to or greater than the rated output, and accumulates the time period information in the storage unit 22 or the like. Next, in S263, the processing unit 21 determines whether or not the time period information accumulated in the storage unit 22 indicates a time period that is equal to or greater than a predetermined time period. If the time information indicates a time period that is equal to or greater than the predetermined time period, the processing unit 21 proceeds to S265, and if not, the processing unit 21 ends the present processing flow. In this case, the reason that the time periods of intervals for which the supplied electric power is equal to or greater than the rated output are measured and accumulated in S263 is that reception of the stored information in S21 of FIG. 6 is performed not just a single time, but is performed a plurality of times while the supply of electric power is continuing. In other words, measured time intervals for which the supplied electric power is equal to or greater than the rated output are accumulated in advance as history information with the intention of proceeding to the processing in S265 at a timing at which the accumulated time period becomes equal to or greater than a predetermined time period.

In S265, the processing unit 21 designates the unknown connected device that is connected to the electrical storage device 3 as being a connected device that exhibits undesirable load characteristics (an incompatible device), and ends the present processing flow and proceeds to S25.

As described above, the rental system according to the present embodiment is constituted by including an information processing apparatus managing usage circumstances at a rental destination of a portable electrical storage device supplying electric power to a detachably connected electrical device. The information processing apparatus acquires information according to the usage circumstances of the portable electrical storage device, and estimates the type of an electrical device that is connected based on a measurement result with respect to a voltage and a current when the portable electrical storage device supplied electric power that is included in the information according to the usage circumstances. Further, in a case where the information processing apparatus cannot estimate the type of the electrical device that is connected, the information processing apparatus determines whether or not the connected electrical device is an electrical device that exhibits desirable load characteristics with respect to a storage battery that is provided in the portable electrical storage device, in accordance with whether or not an electric power supply amount that the measurement result indicates is equal to or greater than a predetermined threshold value. By this means, according to the present invention, the usage circumstances of a portable electrical storage device at a rental destination can be suitably acquired, a connected electrical device and a usage method can be suitably identified, and deterioration of a storage battery can be reduced.

Further, according to the present invention, the information processing apparatus determines the degree of deterioration of the storage battery based on information according to charging and discharging of the storage battery which is included in the information according to the usage circumstances, and the measurement result. By this means, the degree of deterioration of a rechargeable battery can be suitably acquired.

Second Embodiment

A second embodiment of the present invention is described hereunder. In the above first embodiment, an example was described in which, fundamentally, sending and receiving of information is performed by communication between the electrical storage device 3 and the information processing apparatus 2 that is a management server. Note that, in a case where a communication function is provided in the electrical storage device 3, the influence on the production cost and power consumption and the like of the apparatus is significant, and in addition, because the electrical storage device 3 is a portable type, situations may arise in which the electrical storage device 3 is used at a location that is outside the communication range with respect to radio communication. If communication cannot be performed, the fine control described above cannot be performed. Therefore, to solve this problem, in the present embodiment a rental system 901 in a case where a portable electrical storage device is not equipped with a communication function will be described.

<System Configuration>

Figure 10:
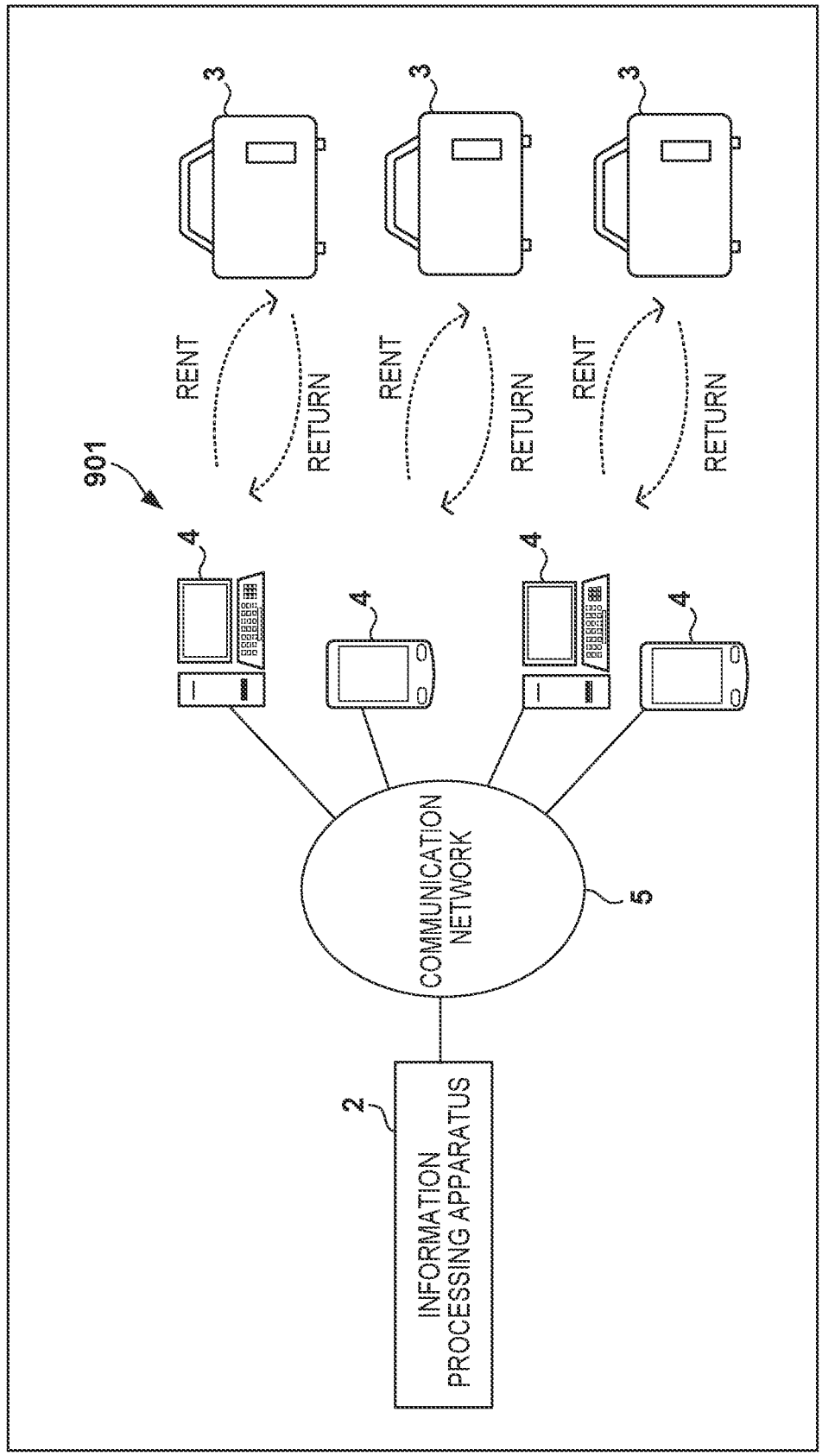
FIG. 10 is a schematic diagram of a rental system according to one embodiment of the present invention.

FIG. 10 is a schematic diagram of the rental system 901. A description of the configuration and control of the rental system 901 that are the same as in the foregoing first embodiment will be omitted here. As illustrated in FIG. 10, in the rental system 901, the information processing apparatus 2 and a plurality of the terminals 4 are communicably connected through the communication network 5. On the other hand, unlike the above first embodiment, because the plurality of electrical storage devices 3 do not have a communication function, the usage circumstances of an electrical storage device 3 that was rented from a service provider is not known until the electrical storage device 3 is returned to the relevant service provider. Therefore, at the timing at which the electrical storage device 3 is returned, information stored in the electrical storage device 3 is read, and is transferred from the terminal 4 to the information processing apparatus 2.

<Portable Electrical Storage Device>

Figure 11:
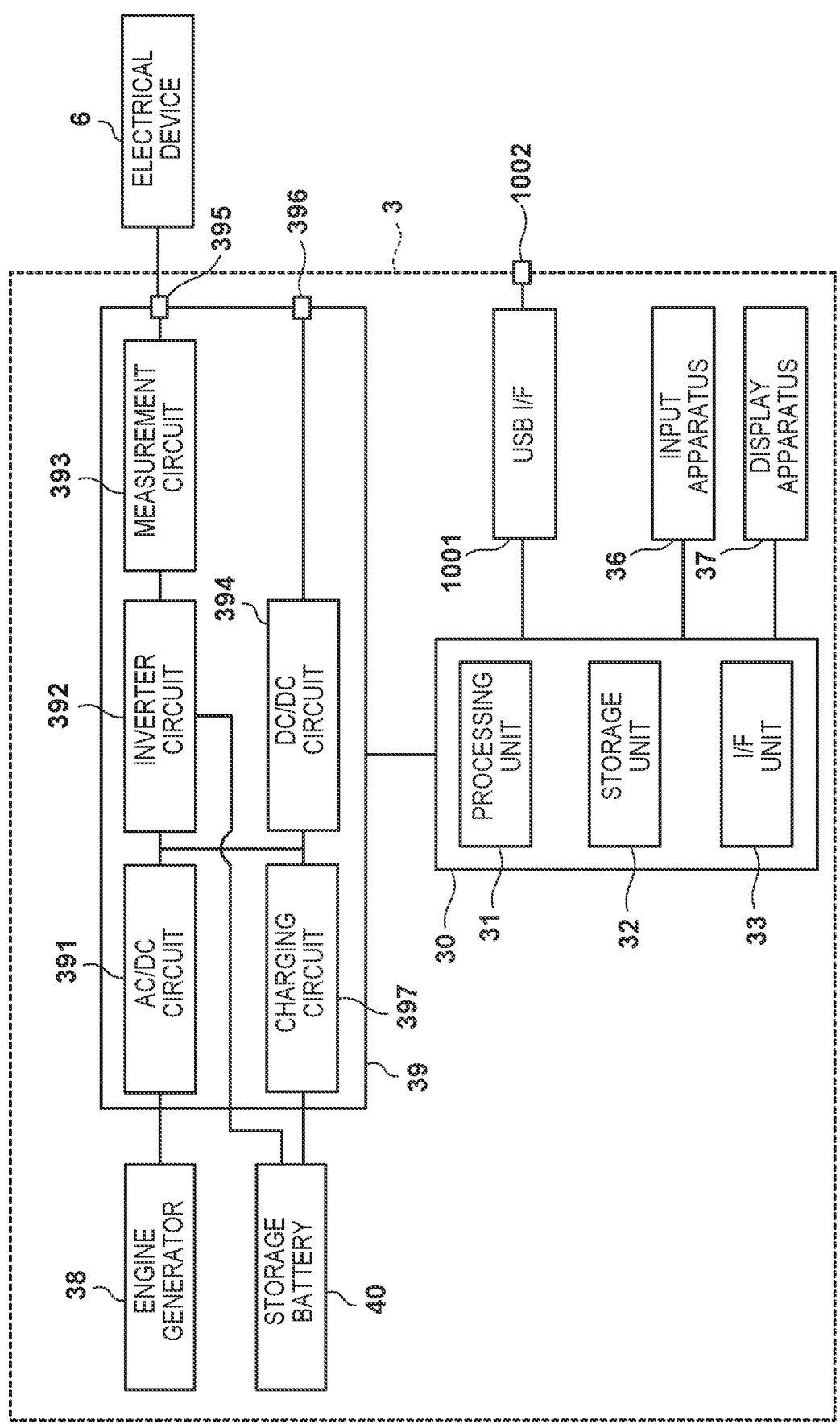
FIG. 11 is a block diagram of a portable electrical storage device according to one embodiment of the present invention.

FIG. 11 is a block diagram of the electrical storage device 3. The electrical storage device 3 of the present embodiment is equipped with a USB I/F 1001 and a connector 1002 instead of the GPS sensor 34 and the communication apparatus 35 that are provided in the above first embodiment. The remaining configuration is the same as in the above first embodiment, and hence a detailed description thereof will be omitted here.

A USB cable is connected to the connector 1002, and information stored in the storage unit 32 can be read through the USB I/F 1001. When the electrical storage device 3 is returned to the service provider, the terminal 4 and the electrical storage device 3 are connected using the USB cable, and information accumulated in the storage unit 32 is read to the terminal 4. The read information is transferred to the information processing apparatus 2.

Figure 6:
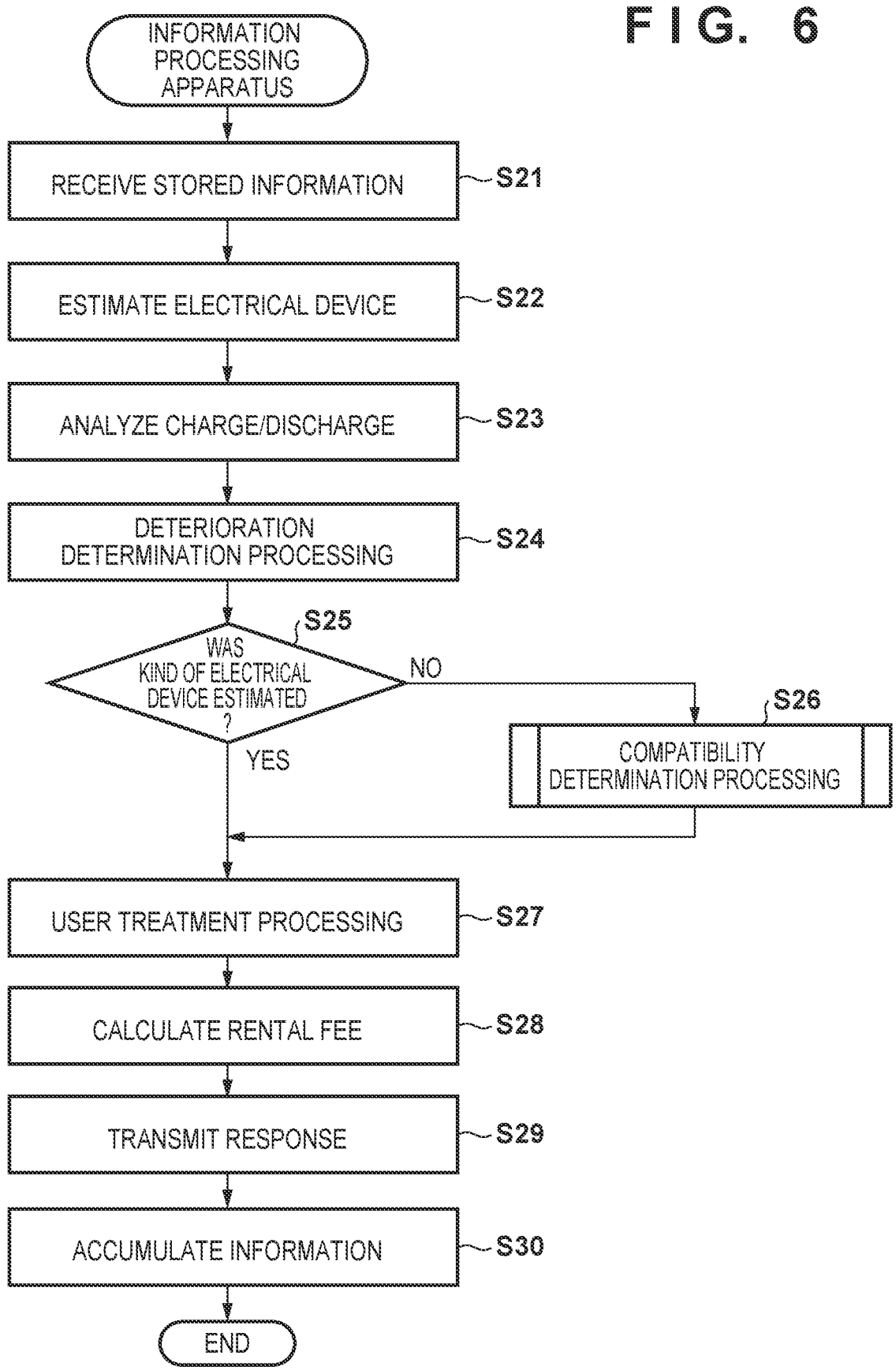
FIG. 6 is a flowchart illustrating an example of processing executed by the information processing apparatus.

The information processing apparatus 2 according to the present embodiment executes basically the same processing as in the flowchart illustrated in FIG. 6. The portions of the processing which differ from the flowchart illustrated in FIG. 6 are that stored information transferred from the terminal 4 is received in S21, and that a response transmission is transmitted to the terminal 4 in S29. Note that, in the present embodiment, because the processing is executed after the electrical storage device 3 is returned, the screen information and the like illustrated in FIG. 8 and FIG. 9 is not generated.

As described above, in the rental system according to the present embodiment, the portable electrical storage device is equipped with a USB interface. Further, information according to the usage circumstances that is stored in the portable electrical storage device is read through the USB interface to a terminal of the service provider that rented out the portable electrical storage device, when the relevant portable electrical storage device is returned. The information processing apparatus receives the stored information through a network from the terminal after the portable electrical storage device is returned to the service provider. According to the present embodiment, an inexpensive electrical storage device 3 can be provided, and a rental fee can be precisely calculated according to the usage circumstances of the electrical device.

Other Embodiment

<Other Example of Configuration of Electric Generator>

Figure 12:
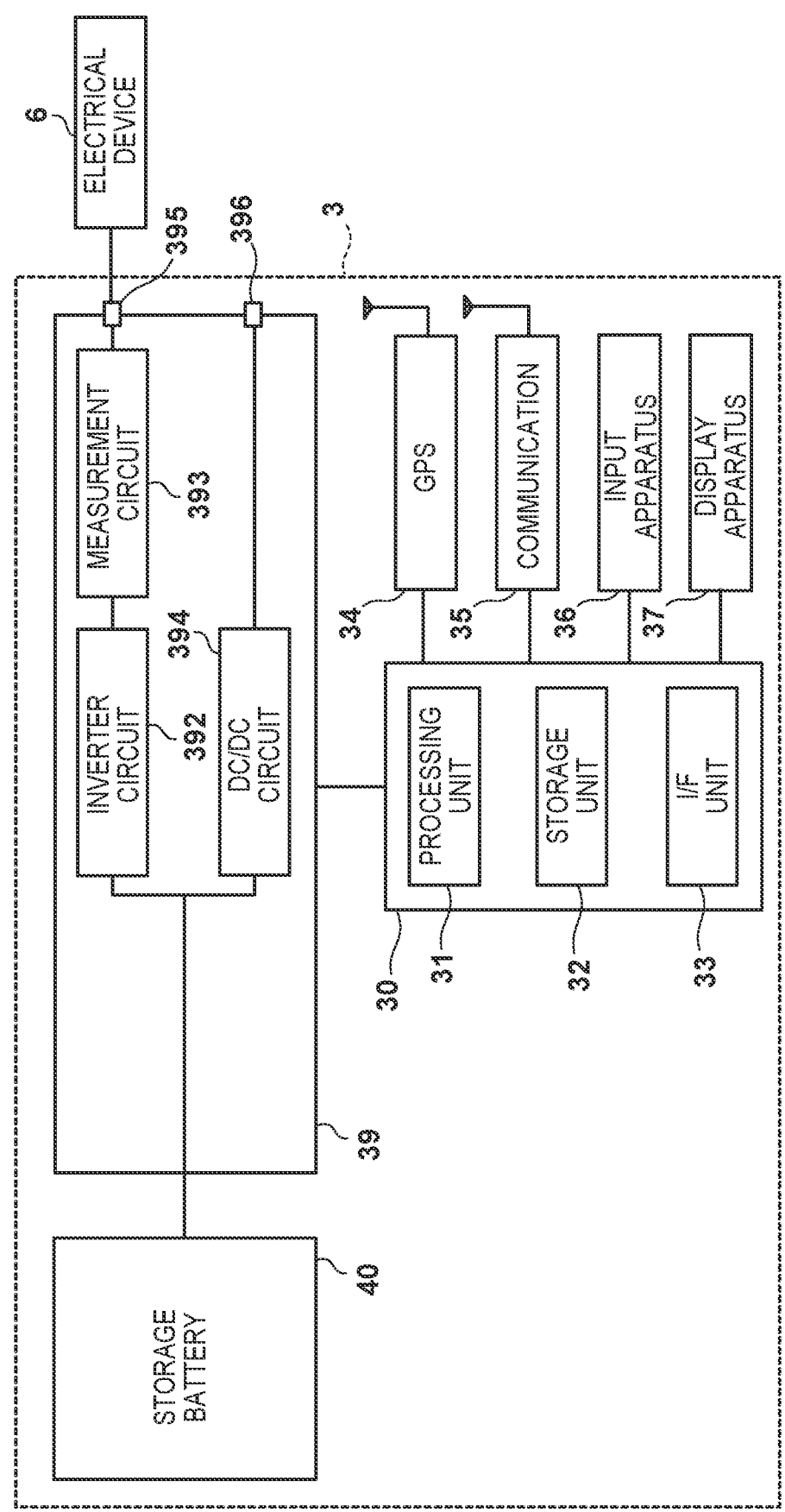
FIG. 12 is a block diagram of a portable electrical storage device according to a different example.

Although in the foregoing embodiments the electrical storage device 3 illustrated in FIG. 2 is configured to include the engine generator 38 and the storage battery 40, the present invention is not limited thereto. FIG. 12 illustrates an electrical storage device 3 for which a configuration is adopted that does not include the engine generator 38 and is only equipped with the storage battery 40. Note that, the respective processing operations do not differ from the foregoing embodiments, and hence a description of the processing will be omitted here. Note that, similarly to the above second embodiment, a configuration may be adopted that is equipped with the USB IF 1001 instead of the GPS sensor 34 and the communication apparatus 35.

Summary of Embodiments

1. An information processing apparatus (for example, 2) of the above embodiments managing usage circumstances at a rental destination of a portable electrical storage device (for example, 3) supplying electric power to a detachably connected electrical device includes:

an acquisition unit (for example, 23, S21) configured to acquire information according to the usage circumstances of the portable electrical storage device;

an estimation unit (for example, 21, S22) configured to estimate a type of an electrical device that is connected, based on a measurement result with respect to a voltage and a current when the portable electrical storage device supplied electric power that is included in the information according to the usage circumstances; and a compatibility determination unit (for example, 26, S261 to S265) configured to, in a case where the type of the connected electrical device cannot be estimated by the estimation unit, determine whether or not the connected electrical device is an electrical device that exhibits desirable load characteristics with respect to a storage battery that is provided in the portable electrical storage device, in accordance with whether or not an electric power supply amount indicated by the measurement result is equal to or greater than a predetermined threshold value.

According to this embodiment, the usage circumstances of a portable electrical storage device at a rental destination can be suitably acquired and a connected electrical device can be identified, and in accordance with the identification, a warning can be presented to the user or an extra charge can be added to the rental fee or the like. Therefore, usage of an electrical device that exhibits undesirable load characteristics by the user can be suppressed, leading to a reduction in the deterioration of the storage battery.

2. In the above-mentioned embodiment, the information processing apparatus further comprises:

a deterioration determination unit (for example, S24) configured to determine a degree of deterioration of the storage battery based on information according to charging and discharging of the storage battery which is included in the information according to the usage circumstances, and the measurement result.

According to this embodiment, the degree of deterioration of the storage battery can be suitably acquired in accordance with the usage circumstances at the rental destination and, for example, based on the determination result, a rental fee can be calculated or the replacement timing with regard to the storage battery can be determined.

3. The information processing apparatus of the above-mentioned embodiment further includes:

a storage unit (for example, storage unit 22, database 27) configured to store a degree of deterioration that is determined by the deterioration determination unit, for each portable electrical storage device; and a notification unit (for example, S30) configured to, upon a degree of deterioration that is stored in the storage unit exceeding a predetermined threshold value, notifying a replacement timing to a terminal of a service provider that rents out the portable electrical storage device in question.

According to this embodiment, the replacement timing with regard to a storage battery can be suitably notified to a service provider.

4. In the above-mentioned embodiment, the portable electrical storage device comprises a communication unit (for example, communication apparatus 35) configured to perform radio communication with the information processing apparatus, and the acquisition unit receives, from the portable electrical storage device, the information according to the usage circumstances that is transmitted through the communication unit, in a period in which the portable electrical storage device is supplying electric power (for example, S21).

According to this embodiment, the usage circumstances at a rental destination can be acquired in real time.

5. In the above-mentioned embodiment, the storage unit further stores information indicating, for each type of the electrical device, whether or not the electrical device exhibits desirable load characteristics with respect to a predetermined storage battery (for example, storage unit 22, database 24), and the notification unit further notifies warning information to the portable electrical storage device in a case where, with respect to the type of the connected electrical device that is estimated by the estimation unit, it is determined that the estimated electrical device is an electrical device which exhibits undesirable load characteristics with respect to a storage battery that is provided in the portable electrical storage device, or in a case where it is determined by the compatibility determination unit that the connected electrical device is an electrical device which exhibits undesirable load characteristics with respect to a storage battery that is provided in the portable electrical storage device (for example, S6, S7, S29).

According to this embodiment, a user can be warned regarding a connected device which exhibits undesirable load characteristics, and the user can be made aware beforehand that a surcharge will be imposed. Note that, in this way, undesirable usage by the user can be suppressed, and deterioration of the storage battery can be reduced.

6. In the above-mentioned embodiment, the warning information includes screen information of a warning screen that is displayed on a display apparatus provided in the portable electrical storage device, and information indicating that a surcharge will be imposed because it is determined by the compatibility determination unit that the electrical device exhibits undesirable load characteristics with respect to the portable electrical storage device is displayed on the warning screen, and a choice regarding whether to continue supplying electric power or stop supplying electric power to the estimated electrical device is displayed in a selectable manner on the warning screen (for example, FIG. 8).

According to this embodiment, even in a case where an electrical device that exhibits undesirable load characteristics is connected, the user can select whether or not to continue to use the portable electrical storage device, and thus control that takes into consideration the intention of the user can be carried out, and there is the effect that the occurrence of trouble with regard to the user when the portable electrical storage device is returned is suppressed by notifying the user in advance indicating that a surcharge will be imposed.

7. In the above-mentioned embodiment, the information processing apparatus further includes:

an accumulation unit configured to, in a case where the type of the connected electrical device cannot be estimated by the estimation unit, store a determination result obtained by the compatibility determination unit in the storage unit as a new type of electrical device (for example, S30, database 24).

According to this embodiment, information according to electrical devices can be suitably accumulated in the information processing apparatus that is a management server, and can be utilized for subsequent use.

8. In the above-mentioned embodiment, the portable electrical storage device includes a USB interface (for example, 1001):

the information according to the usage circumstances that is stored in the portable electrical storage device is read through the USB interface to a terminal of a service provider that rented out the portable electrical storage device, when the portable electrical storage device is returned; and after the portable electrical storage device is returned to the service provider, the acquisition unit receives the information according to the usage circumstances through a network from the terminal.

According to this embodiment, after the portable electrical storage device is returned, the usage circumstances at the rental destination can be suitably acquired and a connected electrical device can be identified, and in accordance with the identification, an extra charge can be added to the rental fee or the like. Therefore, usage of an electrical device that exhibits undesirable load characteristics by the user at the time of subsequent rentals can be suppressed, leading to a reduction in the deterioration of the storage battery.

9. In the above-mentioned embodiment, the compatibility determination unit further determines that the connected electrical device is an electrical device that exhibits undesirable load characteristics with respect to the portable electrical storage device, in a case where the measurement result indicates that supply of electric power exceeding a rated output of the portable electrical storage device was performed for a time period exceeding a predetermined time period.

According to this embodiment, whether or not an electrical device exhibits desirable load characteristics can be determined according to the performance of each electrical storage device that is rented out, and a more detailed determination can be made.

10. In the above-mentioned embodiment, the portable electrical storage device includes a storage battery (for example, 40); and the portable electrical storage device supplies electric power from at least one of an engine generator (for example, 38) or the storage battery.

According to this embodiment, the present invention can be utilized in various forms, and restrictions due to the configuration can be suppressed and a free design can be allowed.

11. An information processing method for an information processing apparatus managing usage circumstances at a rental destination of a portable electrical storage device supplying electric power to a detachably connected electrical device of the above-mentioned embodiment includes:

acquiring information according to the usage circumstances of the portable electrical storage device;

estimating a type of an electrical device that is connected, based on a measurement result with respect to a voltage and a current when the portable electrical storage device supplied electric power that is included in the information according to the usage circumstances; and in a case where the type of the connected electrical device cannot be estimated by the estimating, determining whether or not the connected electrical device is an electrical device that exhibits desirable load characteristics with respect to a storage battery provided in the portable electrical storage device, in accordance with whether or not an electric power supply amount indicated by the measurement result is equal to or greater than a predetermined threshold value.

According to this embodiment, the usage circumstances of a portable electrical storage device at a rental destination can be suitably acquired and a connected electrical device can be identified, and in accordance with the identification, a warning can be presented to the user or an extra charge can be added to the rental fee or the like. Therefore, usage of an electrical device that exhibits undesirable load characteristics by the user can be suppressed, leading to a reduction in the deterioration of the storage battery.

12. A non-transitory computer-readable storage medium storing a program that operates in an information processing apparatus managing usage circumstances at a rental destination of a portable electrical storage device supplying electric power to a detachably connected electrical device of the above-mentioned embodiment includes:

an acquisition step of acquiring information according to the usage circumstances of the portable electrical storage device;

an estimation step of estimating a type of an electrical device that is connected, based on a measurement result with respect to a voltage and a current when the portable electrical storage device supplied electric power that is included in the information according to the usage circumstances; and a compatibility determination step of, in a case where the type of the connected electrical device cannot be estimated in the estimation step, determining whether or not the connected electrical device is an electrical device that exhibits desirable load characteristics with respect to a storage battery that is provided in the portable electrical storage device, in accordance with whether or not an electric power supply amount indicated by the measurement result is equal to or greater than a predetermined threshold value.

According to this embodiment, the usage circumstances of a portable electrical storage device at a rental destination can be suitably acquired and a connected electrical device can be identified, and in accordance with the identification, a warning can be presented to the user or an extra charge can be added to the rental fee or the like. Therefore, usage of an electrical device that exhibits undesirable load characteristics by the user can be suppressed, leading to a reduction in the deterioration of the storage battery.

13. The portable electrical storage device supplying electric power to a detachably connected electrical device of the above-mentioned embodiment includes:

at least one of an engine generator and a storage battery configured to supply electric power to the connected electrical device;

a measurement unit for measuring a voltage and a current when electric power is supplied by at least one of the engine generator and the storage battery;

a transmission unit configured to transmit a measurement result that is measured by the measurement unit to a communicably connected external apparatus; and a control unit configured to, upon receiving a response to the transmission by the transmission unit from the external apparatus, in a case where warning information is included in response information that is received, display information indicating that a surcharge will be imposed because the connected electrical device is an electrical device that exhibits undesirable load characteristics with respect to the portable electrical storage device, as information for a user on a display unit.

According to this embodiment, when a portable electrical storage device is supplying electric power, information according to the usage circumstances can be transmitted to an external apparatus in real time, and warning information in accordance with a response from the information processing apparatus can be presented to the user.

14. The portable electrical storage device supplying electric power to a detachably connected electrical device of the above-mentioned embodiment includes:

at least one of an electric generator and a storage battery configured to supply electric power to the connected electrical device (for example, 38, 40):

a measurement unit configured to measure a voltage and a current when electric power is supplied by at least one of the electric generator and the storage battery (for example, 397, 393); and a storage unit configured to store a measurement result that is measured by the measurement unit (for example, 32).

According to this embodiment, whether or not a connected device exhibits desirable load characteristics can be determined according to the connected electrical device and the usage circumstances at the rental destination, while suppressing the cost of producing the portable electrical storage device.

15. In a rental system that includes the portable electrical storage device supplying electric power to a detachably connected electrical device, and the information processing apparatus managing usage circumstances of the portable electrical storage device at a rental destination according to the above-mentioned embodiment, the portable electrical storage device includes:

at least one of an engine generator and a storage battery configured to supply electric power to the connected electrical device, a measurement unit configured to measure a voltage and a current when electric power is supplied by at least one of the engine generator and the storage battery, a transmission unit configured to transmit a measurement result that is measured by the measurement unit to a communicably connected external apparatus, and a control unit configured to, upon receiving a response to the transmission by the transmission unit from the external apparatus, in a case where warning information is included in response information that is received, display information indicating that a surcharge will be imposed because the connected electrical device is an electrical device that exhibits undesirable load characteristics with respect to the portable electrical storage device, as information for a user on a display unit; and the information processing apparatus includes:

an acquisition unit configured to acquire information according to the usage circumstances of the portable electrical storage device, an estimation unit configured to estimate a type of the connected electrical device based on a measurement result with respect to a voltage and a current when the portable electrical storage device supplied electric power which is included in the information according to the usage circumstances, a compatibility determination unit configured to, in a case where the type of the connected electrical device cannot be estimated by the estimation unit, determine whether or not the connected electrical device is an electrical device that exhibits desirable load characteristics with respect to the portable electrical storage device, in accordance with whether or not an electric power supply amount indicated by the measurement result is equal to or greater than a predetermined threshold value, and a notification unit configured to notify the portable electrical storage device as to whether or not the connected electrical device is an electrical device that exhibits desirable load characteristics with respect to the portable electrical storage device.

According to this embodiment, the usage circumstances of a portable electrical storage device at a rental destination can be suitably acquired and a connected electrical device can be identified, and in accordance with the identification, a warning can be presented to the user or an extra charge can be added to the rental fee or the like. Therefore, usage of an electrical device that exhibits undesirable load characteristics by the user can be suppressed, leading to a reduction in the deterioration of the storage battery.

The present invention is not limited to the above embodiments and various changes and modifications can be made within the spirit and scope of the present invention. Therefore, to apprise the public of the scope of the present invention, the following claims are made.

The invention claimed is:

1. An information processing apparatus managing usage circumstances at a rental destination of a portable electrical storage device supplying electric power to a detachably connected electrical device, the apparatus comprising:
   an acquisition unit configured to acquire information according to the usage circumstances of the portable electrical storage device; and
   an estimation unit configured to estimate a type of an electrical device that is connected, based on a measurement result with respect to a voltage and a current when the portable electrical storage device supplied electric power that is included in the information according to the usage circumstances.

2. The information processing apparatus according to claim 1, further comprising:
   a compatibility determination unit configured to, in a case where the type of the connected electrical device cannot be estimated by the estimation unit, determine whether or not the connected electrical device is an electrical device that exhibits desirable load characteristics with respect to the portable electrical storage device, in accordance with whether or not an electric power supply amount indicated by the measurement result is equal to or greater than a predetermined threshold value.

3. The information processing apparatus according to claim 1, further comprising:
   a deterioration determination unit configured to determine a degree of deterioration of the portable electrical storage device based on information according to charging and discharging of the portable electrical storage device which is included in the information according to the usage circumstances, and the measurement result.

4. The information processing apparatus according to claim 3, further comprising:
   a storage unit configured to store a degree of deterioration that is determined by the deterioration determination unit, for each portable electrical storage device; and
   a notification unit configured to, upon a degree of deterioration that is stored in the storage unit exceeding a predetermined threshold value, notifying a replacement timing to a terminal of a service provider that rents out the portable electrical storage device in question.

5. The information processing apparatus according to claim 4, wherein
   the portable electrical storage device comprises a communication unit configured to perform radio communication with the information processing apparatus, and
   the acquisition unit receives, from the portable electrical storage device, the information according to the usage circumstances that is transmitted through the communication unit, in a period in which the portable electrical storage device is supplying electric power.

6. The information processing apparatus according to claim 5, wherein
   the storage unit further stores information indicating, for each type of the electrical device, whether or not the electrical device exhibits desirable load characteristics with respect to a predetermined portable electrical storage device, and
   the notification unit further notifies warning information in a case where, with respect to the type of the connected electrical device that is estimated by the estimation unit, it is determined that the estimated electrical device is an electrical device which exhibits undesirable load characteristics with respect to the portable electrical storage device, or in a case where it is determined by the compatibility determination unit that the connected electrical device is an electrical device which exhibits undesirable load characteristics with respect to the portable electrical storage device.

7. The information processing apparatus according to claim 6, wherein
   the warning information includes screen information of a warning screen that is displayed on a display apparatus provided in the portable electrical storage device, and
   information indicating that a surcharge will be imposed because it is determined by the compatibility determination unit that the electrical device exhibits undesirable load characteristics with respect to the portable electrical storage device is displayed on the warning screen, and a choice regarding whether to continue supplying electric power or stop supplying electric power to the estimated electrical device is displayed in a selectable manner on the warning screen.

8. The information processing apparatus according to claim 6, further comprising:
   an accumulation unit configured to, in a case where the type of the connected electrical device cannot be estimated by the estimation unit, storing a determination result obtained by the compatibility determination unit in the storage unit as a new type of electrical device.

9. The information processing apparatus according to claim 1, wherein
   the portable electrical storage device includes a USB interface;
   the information according to the usage circumstances that is stored in the portable electrical storage device is read through the USB interface to a terminal of a service provider that rented out the portable electrical storage device, when the portable electrical storage device is returned; and after the portable electrical storage device is returned to the service provider, the acquisition unit receives the information according to the usage circumstances through a network from the terminal.

10. The information processing apparatus according to claim 1, wherein the compatibility determination unit further determines that the connected electrical device is an electrical device that exhibits undesirable load characteristics with respect to the portable electrical storage device, in a case where the measurement result indicates that supply of electric power exceeding a rated output of the portable electrical storage device was performed for a time period exceeding a predetermined time period.

11. The information processing apparatus according to claim 1, wherein the portable electrical storage device comprises a storage battery; and the portable electrical storage device supplies electric power from at least one of an engine generator or the storage battery.

12. An information processing method for an information processing apparatus managing usage circumstances at a rental destination of a portable electrical storage device supplying electric power to a detachably connected electrical device, the method comprising:

acquiring information according to the usage circumstances of the portable electrical storage device; and estimating a type of an electrical device that is connected, based on a measurement result with respect to a voltage and a current when the portable electrical storage device supplied electric power that is included in the information according to the usage circumstances.

13. The information processing method according to claim 12, further comprising:

in a case where the type of the connected electrical device cannot be estimated by the estimating, determining whether or not the connected electrical device is an electrical device that exhibits desirable load characteristics with respect to the portable electrical storage device, in accordance with whether or not an electric power supply amount indicated by the measurement result is equal to or greater than a predetermined threshold value.

14. A non-transitory computer-readable storage medium storing a program that operates in an information processing apparatus managing usage circumstances at a rental destination of a portable electrical storage device supplying electric power to a detachably connected electrical device, the program comprising:

an acquisition step of acquiring information according to the usage circumstances of the portable electrical storage device; and an estimation step of estimating a type of an electrical device that is connected, based on a measurement result with respect to a voltage and a current when the portable electrical storage device supplied electric power that is included in the information according to the usage circumstances.

15. The non-transitory computer-readable storage medium according to claim 14, wherein the program further comprising:

a compatibility determination step of, in a case where the type of the connected electrical device cannot be estimated in the estimation step, determining whether or not the connected electrical device is an electrical device that exhibits desirable load characteristics with respect to the portable electrical storage device, in accordance with whether or not an electric power supply amount indicated by the measurement result is equal to or greater than a predetermined threshold value.

16. A portable electrical storage device supplying electric power to a detachably connected electrical device, the device comprising:

at least one of an engine generator and a storage battery configured to supply electric power to a connected electrical device;

a measurement unit configured to measure a voltage and a current when electric power is supplied to an electrical device that is currently connected by at least one of the engine generator and the storage battery;

a transmission unit configured to transmit a measurement result that is measured by the measurement unit to a communicably connected external apparatus; and a control unit configured to, upon receiving a response to the transmission by the transmission unit from the external apparatus, in a case where warning information is included in response information that is received, display information indicating that a surcharge will be imposed because the electrical device that is currently connected is an electrical device that exhibits undesirable load characteristics with respect to the portable electrical storage device, as information for a user on a display unit.

17. A rental system including a portable electrical storage device supplying electric power to a detachably connected electrical device, and an information processing apparatus managing usage circumstances of the portable electrical storage device at a rental destination, the portable electrical storage device comprising:

at least one of an engine generator and a storage battery configured to supply electric power to the connected electrical device, a measurement unit configured to measure a voltage and a current when electric power is supplied by at least one of the electric generator and the storage battery, a transmission unit configured to transmit a measurement result that is measured by the measurement unit to a communicably connected external apparatus, and a control unit configured to, upon receiving a response to the transmission by the transmission unit from the external apparatus, in a case where warning information is included in response information that is received, display information indicating that a surcharge will be imposed because the connected electrical device is an electrical device that exhibits undesirable load characteristics with respect to the portable electrical storage device, as information for a user on a display unit.

18. The rental system according to claim 17, wherein the information processing apparatus comprises:

an acquisition unit configured to acquire information according to the usage circumstances of the portable electrical storage device, an estimation unit configured to estimate a type of the connected electrical device based on a measurement result with respect to a voltage and a current when the portable electrical storage device supplied electric power which is included in the information according to the usage circumstances, a compatibility determination unit configured to, in a case where the type of the connected electrical device cannot be estimated by the estimation unit, determine whether or not the connected electrical device is an electrical device that exhibits desirable load characteristics with respect to the portable electrical storage device, in accordance with whether or not an electric power supply amount indicated by the measurement result is equal to or greater than a predetermined threshold value, and a notification unit configured to notify as to whether or not the connected electrical device is an electrical device that exhibits desirable load characteristics with respect to the portable electrical storage device.

* * * * *